(12) United States Patent
Kawamori et al.

(10) Patent No.: US 10,068,219 B2
(45) Date of Patent: Sep. 4, 2018

(54) INFORMATION PROCESSING METHOD AND RECORDING SYSTEM

(71) Applicant: Seiko Epson Corporation, Tokyo (JP)

(72) Inventors: Takashi Kawamori, Shiojiri (JP); Shigeru Aoki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 405 days.

(21) Appl. No.: 14/826,689

(22) Filed: Aug. 14, 2015

(65) Prior Publication Data

US 2016/0063472 A1  Mar. 3, 2016

(30) Foreign Application Priority Data

Aug. 29, 2014 (JP) ................... 2014-174772

(51) Int. Cl.

| | | |
|---|---|---|
| *G06G 1/12* | (2006.01) | |
| *G06Q 20/20* | (2012.01) | |
| *G06Q 10/08* | (2012.01) | |
| *G07F 9/02* | (2006.01) | |
| *G06F 3/12* | (2006.01) | |
| *H04L 12/24* | (2006.01) | |
| *H04L 29/12* | (2006.01) | |

(52) U.S. Cl.

CPC .......... *G06Q 20/209* (2013.01); *G06Q 10/08* (2013.01); *G06Q 20/202* (2013.01); *G07F 9/026* (2013.01); *H04L 41/0806* (2013.01); *H04L 61/2015* (2013.01); *H04L 61/2038* (2013.01)

(58) Field of Classification Search
USPC ......................................................... 705/21
See application file for complete search history.

(56) References Cited

U.S. PATENT DOCUMENTS

| | | | |
|---|---|---|---|
| 6,188,675 B1 * | 2/2001 | Casper | ................... H04L 45/02 370/254 |
| 6,714,972 B1 * | 3/2004 | Lee | ..................... H04L 12/5601 370/397 |
| 6,950,865 B1 * | 9/2005 | Depaolantonio | ..... H04L 43/065 709/223 |

(Continued)

FOREIGN PATENT DOCUMENTS

| | | |
|---|---|---|
| JP | 2008-059471 A | 3/2008 |
| JP | 2011-148398 A | 8/2011 |
| JP | 2013-131001 A | 7/2013 |

*Primary Examiner* — Ashford S Hayles
(74) *Attorney, Agent, or Firm* — Nutter McClennen & Fish LLP; John J. Penny, Jr.; Todd A. Gerety

(57) ABSTRACT

A recording device transmits attribute information. A management device receives the attribute information transmitted by the recording device, and sends environmental settings information stored relationally to the attribute information to the recording device. The recording device receives the environmental settings information sent by the management device, configures environmental settings based on the environmental settings information, and sends a configuration completion report indicating configuration was completed to the management device when configuration is completed. The management device receives the configuration completion report sent by the recording device, and stores the environmental settings information sent to the recording device relationally to the identification information of the recording device.

10 Claims, 14 Drawing Sheets

(56) References Cited

U.S. PATENT DOCUMENTS

| | | | | |
|---|---|---|---|---|
| 7,071,972 B2* | 7/2006 | Koyama | G06F 9/4411 | 348/207.1 |
| 7,075,668 B2* | 7/2006 | Parry | H04N 1/00244 | 358/1.14 |
| 7,363,260 B1* | 4/2008 | Stamler | G06Q 10/087 | 705/28 |
| 7,461,375 B2* | 12/2008 | Kazumi | G06F 9/4411 | 717/176 |
| 7,631,110 B2* | 12/2009 | Berenbaum | G06F 13/42 | 710/300 |
| 7,774,774 B1* | 8/2010 | Mulligan | G06F 9/44505 | 717/168 |
| 7,836,443 B2* | 11/2010 | Akerman | G06F 9/505 | 717/171 |
| 8,301,898 B2* | 10/2012 | Kishi | G06F 21/608 | 455/556.1 |
| 8,473,597 B2* | 6/2013 | Igarashi | H04L 29/12009 | 709/202 |
| 9,363,709 B2* | 6/2016 | Vasisht | H04W 28/18 | |
| 9,629,928 B1* | 4/2017 | Olsen | A61K 48/00 | |
| 2002/0030094 A1* | 3/2002 | Curry | G04B 47/00 | 235/375 |
| 2003/0028628 A1* | 2/2003 | Irwin | G06F 9/4451 | 709/222 |
| 2003/0115339 A1* | 6/2003 | Hodoshima | H04W 28/18 | 709/228 |
| 2004/0120260 A1* | 6/2004 | Bernier | H04L 61/2015 | 370/252 |
| 2004/0133553 A1* | 7/2004 | Suto | G06F 3/1203 | |
| 2005/0006468 A1* | 1/2005 | Fandel | G06Q 20/20 | 235/383 |
| 2005/0083854 A1* | 4/2005 | Nagarajrao | H04L 41/046 | 370/254 |
| 2005/0200883 A1* | 9/2005 | Mannion | G06F 3/1203 | 358/1.15 |
| 2005/0253722 A1* | 11/2005 | Droms | G08B 13/2402 | 340/572.1 |
| 2005/0256939 A1* | 11/2005 | Naismith | G05B 19/0426 | 709/219 |
| 2005/0279833 A1* | 12/2005 | Tanaka | H04N 1/00278 | 235/462.46 |
| 2006/0067224 A1* | 3/2006 | Ohara | H04L 43/00 | 370/232 |
| 2006/0092861 A1* | 5/2006 | Corday | H04L 41/0213 | 370/256 |
| 2006/0105714 A1* | 5/2006 | Hall | H04W 12/08 | 455/41.3 |
| 2006/0112379 A1* | 5/2006 | Chirakansakcharoen | G06F 9/445 | 717/166 |
| 2006/0168244 A1* | 7/2006 | Anderson | H04L 29/06 | 709/227 |
| 2006/0173976 A1* | 8/2006 | Vincent | H04L 63/08 | 709/220 |
| 2007/0027964 A1* | 2/2007 | Herrod | H04L 41/0806 | 709/220 |
| 2007/0054741 A1* | 3/2007 | Morrow | G07F 17/32 | 463/42 |
| 2007/0152058 A1* | 7/2007 | Yeakley | G06F 17/2247 | 235/462.01 |
| 2007/0168471 A1* | 7/2007 | Childress | H04L 67/104 | 709/220 |
| 2007/0201081 A1* | 8/2007 | Murayama | H04L 67/36 | 358/1.15 |
| 2007/0284441 A1* | 12/2007 | Walczyk | G06Q 20/202 | 235/383 |
| 2008/0179388 A1* | 7/2008 | Pang | G06K 7/10851 | 235/375 |
| 2009/0031123 A1* | 1/2009 | Kruys | H04L 41/08 | 713/1 |
| 2009/0059272 A1* | 3/2009 | Matsushita | G06F 9/4411 | 358/1.15 |
| 2009/0145958 A1* | 6/2009 | Stoutenburg | G06Q 20/04 | 235/376 |
| 2009/0150458 A1* | 6/2009 | Igarashi | G06F 17/30569 | |
| 2009/0192815 A1* | 7/2009 | Canada | G06F 11/0748 | 705/1.1 |
| 2009/0196456 A1* | 8/2009 | Bisti | G06F 21/36 | 382/100 |
| 2009/0232094 A1* | 9/2009 | Cheng | H04W 36/0011 | 370/331 |
| 2009/0237715 A1* | 9/2009 | Kasatani | H04L 63/0815 | 358/1.15 |
| 2009/0273334 A1* | 11/2009 | Holovacs | G06F 1/26 | 324/66 |
| 2010/0042708 A1* | 2/2010 | Stamler | G06Q 10/087 | 709/221 |
| 2010/0050249 A1* | 2/2010 | Newman | H04L 63/126 | 726/15 |
| 2010/0054156 A1* | 3/2010 | DeHaan | H04L 67/34 | 370/255 |
| 2010/0118330 A1* | 5/2010 | Feijoo | G06F 3/1289 | 358/1.15 |
| 2010/0165877 A1* | 7/2010 | Shukla | H04L 41/0843 | 370/254 |
| 2010/0220350 A1* | 9/2010 | Faridi | H04L 41/026 | 358/1.15 |
| 2011/0010437 A1* | 1/2011 | Christenson | H04L 12/00 | 709/222 |
| 2011/0147447 A1* | 6/2011 | Bandholz | G06F 9/4403 | 235/375 |
| 2011/0235085 A1* | 9/2011 | Jazayeri | G06F 3/1204 | 358/1.14 |
| 2011/0242569 A1* | 10/2011 | Ohara | G06F 3/1205 | 358/1.13 |
| 2012/0044524 A1* | 2/2012 | Kong | G03G 15/5079 | 358/1.15 |
| 2012/0158922 A1* | 6/2012 | Aggarwal | H04L 63/104 | 709/220 |
| 2012/0188604 A1* | 7/2012 | Uchikawa | G06F 9/4411 | 358/1.15 |
| 2012/0250065 A1* | 10/2012 | Partridge | G06F 21/608 | 358/1.14 |
| 2012/0324210 A1* | 12/2012 | Shibao | H04L 41/0813 | 713/1 |
| 2013/0138517 A1* | 5/2013 | Khan | G06Q 30/00 | 705/16 |
| 2013/0163020 A1 | 6/2013 | Nakamura | | |
| 2013/0166425 A1* | 6/2013 | Chen | G06F 21/608 | 705/35 |
| 2013/0254050 A1* | 9/2013 | Zhu | G06Q 20/20 | 705/20 |
| 2014/0052554 A1* | 2/2014 | Abraham | G07G 1/14 | 705/21 |
| 2014/0053281 A1* | 2/2014 | Benoit | H04L 12/2809 | 726/29 |
| 2014/0056171 A1* | 2/2014 | Clegg | H04W 12/06 | 370/254 |
| 2014/0092422 A1* | 4/2014 | Shima | G06F 3/1204 | 358/1.14 |
| 2014/0118778 A1* | 5/2014 | Lee | H04N 1/00127 | 358/1.15 |
| 2014/0146709 A1* | 5/2014 | Zsigmond | H04L 67/34 | 370/255 |
| 2014/0164499 A1* | 6/2014 | Jang | H04W 8/24 | 709/203 |
| 2014/0172783 A1* | 6/2014 | Suzuki | G06F 8/63 | 707/609 |
| 2014/0181911 A1* | 6/2014 | Kula | H04L 63/0853 | 726/4 |
| 2014/0218164 A1* | 8/2014 | Mahapatra | G08B 25/003 | 340/5.1 |
| 2014/0280913 A1* | 9/2014 | Karren | H04W 4/001 | 709/224 |
| 2014/0282937 A1* | 9/2014 | Farber | H04L 63/08 | 726/6 |
| 2014/0379913 A1* | 12/2014 | Niimura | H04L 67/34 | 709/225 |

(56) References Cited

U.S. PATENT DOCUMENTS

| | | | |
|---|---|---|---|
| 2015/0066671 A1* | 3/2015 | Nichols | G06Q 20/20 705/18 |
| 2015/0067671 A1* | 3/2015 | Kamiya | G06F 8/61 717/174 |
| 2015/0081837 A1* | 3/2015 | Bernier | H04W 8/24 709/217 |
| 2015/0188748 A1* | 7/2015 | Watariuchi | H04L 41/046 709/220 |
| 2015/0189124 A1* | 7/2015 | Mondo | H04N 1/4426 358/1.14 |
| 2015/0261476 A1* | 9/2015 | Yamada | H04L 41/08 358/1.15 |
| 2015/0288670 A1* | 10/2015 | Bhooshan | H04W 12/06 726/7 |
| 2015/0295759 A1* | 10/2015 | Mollersten | H04L 41/0843 709/222 |
| 2015/0319043 A1* | 11/2015 | Dibirdi | H04L 41/0806 370/254 |
| 2015/0324153 A1* | 11/2015 | Ding | G06F 3/1206 358/1.15 |
| 2015/0372866 A1* | 12/2015 | Kelly | H04L 41/0886 370/255 |
| 2015/0372971 A1* | 12/2015 | Hashimoto | H04L 61/2007 709/245 |
| 2016/0062786 A1* | 3/2016 | Meng | G06F 9/45558 718/1 |
| 2016/0063472 A1* | 3/2016 | Kawamori | G06Q 20/209 705/21 |

* cited by examiner

ATTRIBUTE
INFORMATION DATABASE

| ATTRIBUTE INFORMATION | CONFIGURATION DATA SCALE INFORMATION | APPLICATION SCALE INFORMATION | DEVICE DRIVER SCALE INFORMATION |
|---|---|---|---|
| ID001 | LARGE-SCLAE-STORE | MID-SCALE-STORE | LARGE-SCLAE-STORE |
| ID002 | MID-SCALE-STORE | SMALL-SCALE-STORE | MID-SCALE-STORE |

．
．
．

SERIAL NUMBER DATABASE

| SERIAL NUMBER | IP ADDRESS | ATTRIBUTE INFORMATION | CONFIGURATION INFORMATION FILE | APPLICATION CONFIGURATION PROGRAM FILE | DEVICE DRIVER CONFIGURATION PROGRAM FILE | CONFIGURATION TIME STAMP |
|---|---|---|---|---|---|---|
| S0001 | 192.168.3.10 | ID001 | FILE F1 | FILE A1 | FILE D1 | 2014/1/1/ 12:00:05 |
| S0002 | 192.168.3.11 | ID001 | FILE F2 | FILE A2 | FILE D2 | 2014/1/1/ 12:30:00 |
| S0003 | 192.168.10.10 | ID002 | FILE F3 | FILE A3 | FILE D3 | 2014/1/1/ 13:00:00 |

⋮

INFORMATION PROCESSING METHOD AND RECORDING SYSTEM

Priority is claimed under 35 U.S.C. § 119 to Japanese Application no. 2014-174772 filed on Aug. 29, 2014 which is hereby incorporated by reference in their entirety.

BACKGROUND

1. Technical Field

The present disclosure relates to an information processing method and a recording system.

2. Related Art

Systems in which devices such as recording devices recording devices are connected to a management device through a network and are managed by the management device are known from the literature. See, for example, JP-A-2008-59471.

When a recording device is installed in such a system, communication-related settings and settings related to the recording operation must be input to the recording device. In a system in which recording devices connect to a management device through a network as described in JP-A-2008-59471, being able to use the ability of the devices to communicate through the network to configure the recording device is desirable.

SUMMARY

The present disclosure is directed to this problem, and provides technology enabling configure the recording device by using the ability of the recording device and management device to communicate over a network.

An information processing method according to the disclosure includes: a recording device transmitting attribute information; a management device receiving the attribute information transmitted by the recording device, and sending environmental settings information stored relationally to the attribute information to the recording device; the recording device receiving the environmental settings information sent by the management device, configuring environmental settings based on the environmental settings information, and sending a configuration completion report indicating configuration was completed to the management device when configuration is completed; and the management device receiving the configuration completion report sent by the recording device, and relationally storing the environmental settings information sent to the recording device with identification information of the recording device.

Thus comprised, a recording device can be configured using a configuration in which a recording device and a management device communicate over a network.

The information processing method of the disclosure preferably also includes: the recording device sending the identification information with the attribute information to the management device; and the management device storing the identification information received with the attribute information from the recording device relationally to the environmental settings information sent to the recording device.

Thus comprised, the recording device can use transmission of its attribute information to the management device to send its serial number with the attribute information to the management device.

The information processing method of the disclosure preferably also includes: the recording device sending the identification information with the configuration completion report to the management device; and the management device storing the identification information received with the configuration completion report from the recording device relationally to the environmental settings information sent to the recording device.

Thus comprised, the recording device can use transmission of the configuration completion report to the management device to send its serial number with the configuration completion report to the management device.

Further preferably in the information processing method according to another aspect of the disclosure, the environmental settings information includes a first address that is used when the recording device connects to a first network; and the management device adjusts the value of the first address contained in the environmental settings information based on the attribute information of the recording when sending the environmental settings information to the recording device.

Thus comprised, the management device can set an address of a value appropriate to the attribute information in the recording device.

Further preferably in the information processing method according to another aspect of the disclosure, the recording device uses a second address to connect to the management device through a second network and acquire the environmental settings information, configures the environmental settings other than setting the first address, and after sending the configuration completion report to the management device, changes the address setting from the second address to the first address and connects to the first network.

Thus comprised, when the recording device connection changes from the second network to the first network, the recording device can connect to the first network using the IP address set by the management device.

In an information processing method according to another aspect of the disclosure, the recording device executes a process appropriate to the error that occurred when an error occurs while receiving the environmental settings information or while configuring the environmental settings based on the environmental settings information.

Thus comprised, the recording device can execute an appropriate error handling process and suppress problems resulting from an error when an error occurs while receiving the environmental settings information or while configuring environmental settings based on the environmental settings information.

Another aspect of the disclosure is a recording system including a recording device that transmits attribute information, configures environmental settings based on environmental settings information received based on the transmitted attribute information, and transmits a configuration completion report indicating configuration was completed when configuration is completed; and a management device that stores the environmental settings information relationally to the attribute information, sends the environmental settings information stored relationally to the received attribute information to the recording device when the attribute information is received from the recording device, and when the configuration completion report based on the transmitted environmental settings information is received, relationally stores the environmental settings information sent to the recording device with identification information of the recording device.

Thus comprised, a recording device can be configured using a configuration in which a recording device and a management device communicate over a network.

Other objects and attainments together with a fuller understanding of the disclosure will become apparent and appreciated by referring to the following description and claims taken in conjunction with the accompanying drawings.

DESCRIPTION OF EMBODIMENTS

A preferred embodiment of the present disclosure is described below with reference to the accompanying figures.

Figure 1:
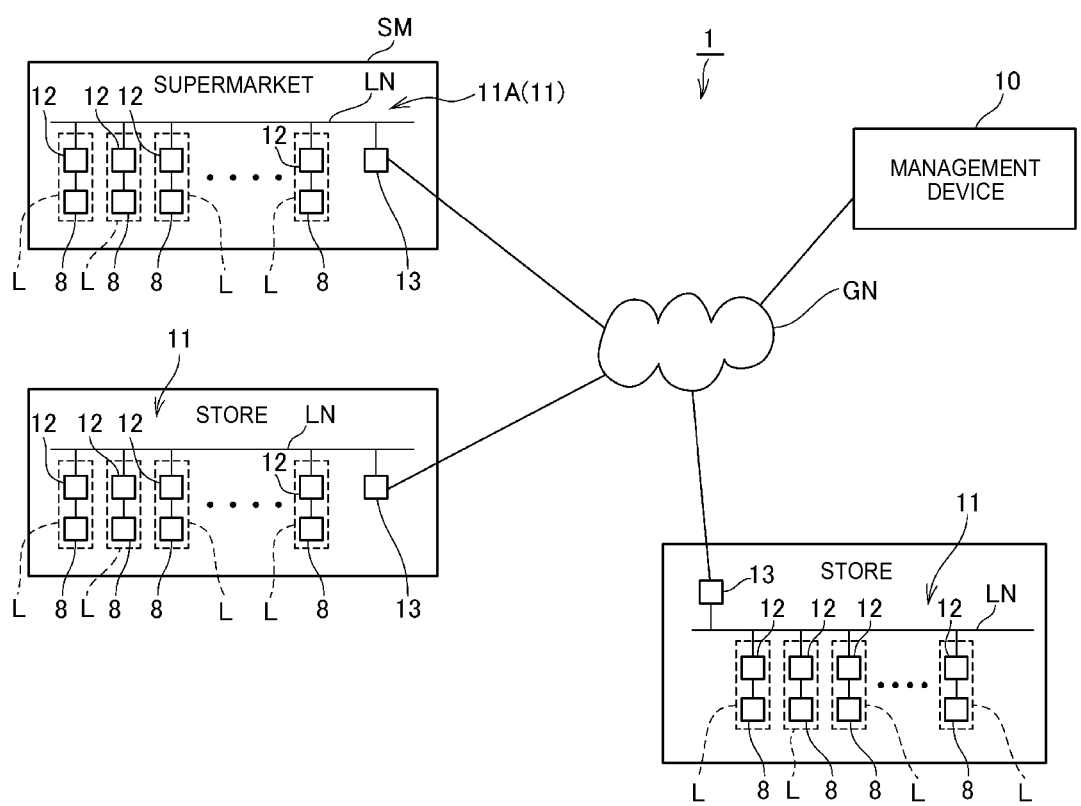
FIG. 1 illustrates a recording system according to a preferred embodiment of the disclosure.

FIG. 1 shows the configuration of a recording system 1 according to a preferred embodiment of the disclosure.

As shown in FIG. 1, the recording system 1 includes a plurality of store systems 11. A store system 11 is a system that is used in retail businesses such as supermarkets, convenience stores, department stores, and restaurants. The store system 11 has a function for producing sales (transaction) receipts for customers of the business.

The store system 11 has one or more recording devices 12 for producing receipts. Each recording device 12 connects to a local area network LN (first network) deployed in the store. A network communication controller 13 including a communication device such as a network router or modem connects to the local area network LN. The recording device 12 accesses the network GN through the network communication controller 13.

A POS terminal 8 connects to the recording device 12 in the store system 11. A POS application and printer driver are installed on the POS terminal 8. As described below, the POS terminal 8 controls the recording device 12 and produces receipts with the recording device 12 by functions of a POS application and printer driver.

One or more checkout counters L are located in the business. A recording device 12 and a POS terminal 8 connected to the recording device 12 are installed at each checkout counter L. A checkout counter L is where a sale transaction with a customer is processed. A checkout clerk works at each checkout counter L, and the POS terminal 8 controls the recording device 12 and produces receipts based on instructions from the checkout clerk.

In the example shown in FIG. 1, the store system 11A is a system used in a supermarket SM. Plural checkout counters L are set up in the supermarket SM. A recording device 12 and a POS terminal 8 are installed at each checkout counter L. A customer purchasing a product in the supermarket SM completes a sale transaction at the checkout counter L. The POS terminal 8 executes a payment process according to the transaction, and sends control data instructing producing a receipt to the recording device 12. Based on the received control data, the recording device 12 produces a receipt. The printed receipt is given to the customer.

As shown in FIG. 1, a management device 10 connects to the network GN. The management device 10 is a system comprising a server device. The functions of the management device 10, and processes executed by the management device 10, are described further below.

Figure 2:
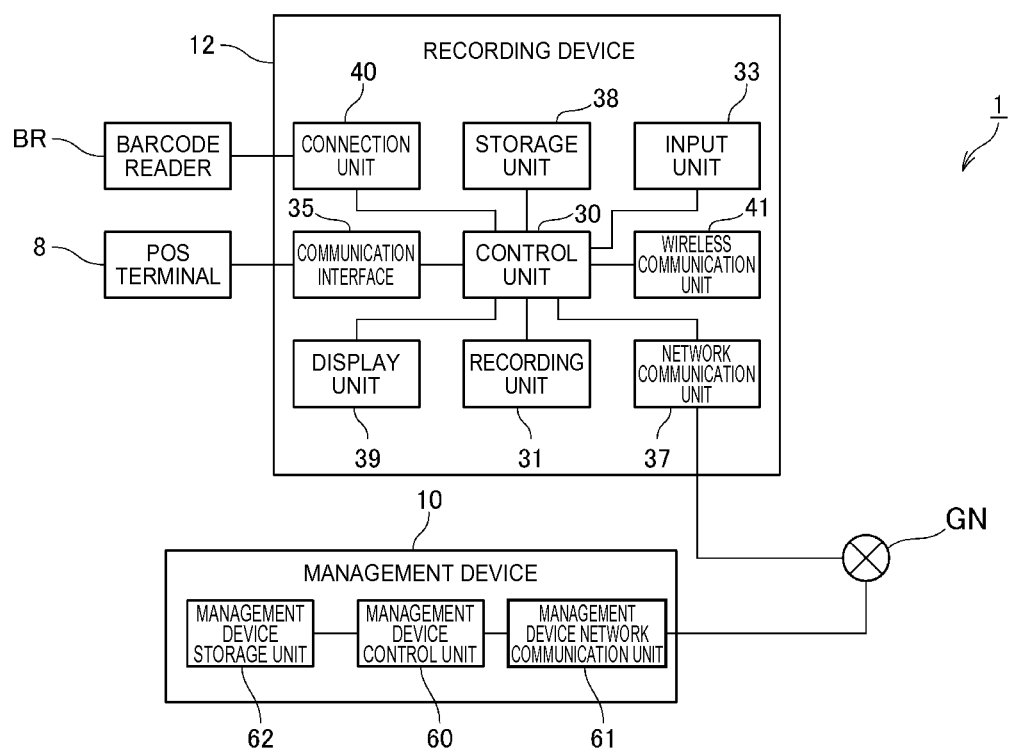
FIG. 2 is a block diagram illustrating the functional configuration of a recording system.

FIG. 2 is a block diagram showing the functional configuration of the recording system 1.

As shown in FIG. 2, the recording system 1 includes a POS terminal 8, a recording device 12, and a management device 10.

The recording device 12 is a thermal line printer that stores roll paper (recording media) and records images by forming dots by a thermal line head on the roll paper.

As shown in FIG. 2, the recording device 12 includes a control unit 30, a recording unit 31, an input unit 33, a communication interface 35, a network communication unit 37, a storage unit 38, a display unit 39, a connection unit 40, and a wireless communication unit 41.

The control unit 30 includes a CPU, ROM, RAM, and controls the recording device 12. The control unit 30 controls the recording device 12 by reading and running firmware stored in ROM, for example.

The recording unit 31 includes a thermal head, a roll paper conveyance mechanism, a cutter unit for cutting the roll paper, and other mechanisms and devices related to recording on the roll paper, and forms dots and records on the roll paper as controlled by the control unit 30.

The input unit 33 includes operating switches disposed to the cabinet of the recording device 12, detects operation of the operating switches, and outputs to the control unit 30. Based on input from the input unit 33, the control unit 30 detects the operations corresponding to the operated switch, and runs a process appropriate to the operation.

The communication interface 35 communicates with the POS terminal 8 according to a specific communication protocol as controlled by the control unit 30.

The network communication unit 37 communicates with other devices (such as the management device 10) connected to the network GN through the network GN according to a specific communication protocol as controlled by the control unit 30.

The storage unit 38 includes nonvolatile memory, and stores data.

The display unit 39 has an LCD display panel, for example, and displays information as controlled by the control unit 30.

The connection unit 40 communicates with devices that connect to the recording device 12 according to a specific wireless communication protocol. In this embodiment of the disclosure, at least a barcode reader BR can connect as a device to the recording device 12.

A barcode reader BR is a reading device for optically reading barcodes. When a barcode is read, the barcode reader BR outputs the information recorded by the barcode to the connection unit 40. The connection unit 40 then outputs the information input from the barcode reader BR to the control unit 30.

The wireless communication unit 41 communicates wirelessly according to a specific wireless communication protocol compatible with the wireless LAN as controlled by the control unit 30.

As shown in FIG. 2, the management device 10 includes a management device control unit 60, a management device network communication unit 61, and a management device storage unit 62.

The management device control unit 60 includes CPU, ROM, RAM, and other peripheral circuits, and controls the management device 10.

The management device network communication unit 61 communicates with devices (including the recording devices 12) connected to the network GN through the network GN according to a specific communication protocol as controlled by the management device control unit 60.

The management device storage unit 62 is nonvolatile memory and stores data.

Operation of the POS terminal 8, recording device 12, and management device 10 when processing a transaction is described next.

Figure 3:
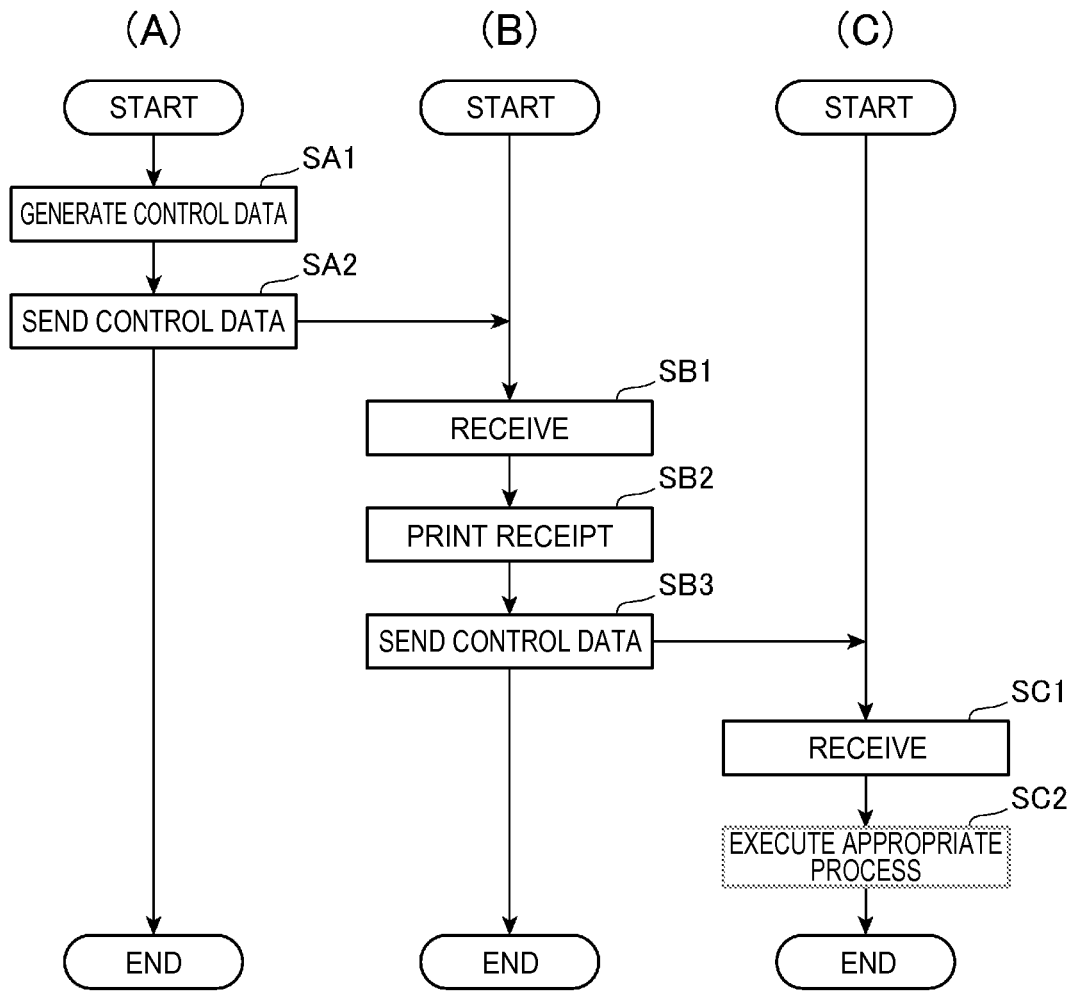
FIG. 3 is a flow chart of the operation of devices in the recording system.

FIG. 3 is a flow chart of the operation of devices in the recording system 1 when processing a transaction, (A) showing the operation of the POS terminal 8, (B) showing the operation of the recording device 12, and (C) showing the operation of the management device 10.

As shown in column (A) of FIG. 3, the POS terminal 8 executes a payment process appropriately to the customer transaction, and generates control data based on the payment process (step SA1).

More specifically, the function blocks of the POS terminal 8 include a POS application execution unit that runs a POS application, and a printer driver execution unit that runs a printer driver.

The POS application execution unit generates receipt information including the information to print on a receipt according to the customer transaction. The receipt information is information including, for example, information related to a logo printed on the receipt; when the receipt is printed (date and time); information related to the names, prices, quantities, and applicable tax for the products the customer purchased; the purchase total; the amount received from the customer; the amount of change due; or other information. While not shown in the figures, a barcode reader that read barcodes from products or product packaging is connected to the POS terminal 8. When processing a transaction for a customer of the business, the POS application execution unit gets required information from product master and customer master databases by specific means as needed and generates the receipt information based on input from the barcode reader or input by the checkout clerk through a keypad or other input means.

After generating the receipt information, the printer driver execution unit generates control data, which is control data based on the command language of the recording device 12, instructing printing the receipt information.

Next, the POS terminal 8 sends the generated control data to the recording device 12 (step SA2).

As shown in column (B) of FIG. 3, the control unit 30 of the recording device 12 controls the communication interface 35 to receive the control data (step SB1).

Next, the control unit 30 controls the recording unit 31 to produce a receipt (step SB2).

Next, the control unit 30 controls the network communication unit 37 to send the control data received in step SB1 to the management device 10 (step SB3).

As shown in column (C) of FIG. 3, the management device control unit 60 of the management device 10 controls the management device network communication unit 61 to receive the control data sent from the recording device 12 (step SC1).

The management device control unit 60 then executes a process appropriate to the received control data (step SC2).

For example, the management device control unit 60 may analyze the received control data to determine whether or not to produce a coupon, and if a coupon is to be produced, instruct the recording device 12 to produce the coupon. As a result, coupons can be issued based on the result of analyzing the control data. The management device control unit 60 may also relationally store the control data to information identifying the recording device 12 that sent the control data, or information identifying the store in which the recording device 12 that sent the control data is located. As a result, the accumulated control data can later be used to analyze and follow how different products are selling in different stores.

As described above, each recording device 12 is connected to the local area network LN deployed in a particular store. The IP address used in the local area network LN, and settings for communicating over the local area network LN, must therefore be set in the recording device 12, The recording device 12 also communicates with the management device 10 through the network GN. Settings enabling communicating over the network GN must therefore also be set in the recording device 12.

Because devices can also be connected to the recording device 12, device drivers for the devices that may be connected must also be installed on the recording device 12.

Because the recording device 12 also executes processes as controlled by the POS terminal 8, an application for running processes as controlled by the POS terminal 8 must also be installed on the recording device 12.

When a recording device 12 is added to the store system 11, various settings must therefore be configured in the recording device 12. As a result, this embodiment of the disclosure uses functions of the recording device 12 and the management device 10 to simplify configuring settings in the recording device 12 when a recording device 12 is added to the store system 11.

The operation of the recording device 12 and the management device 10 when configuring settings in the recording device 12 is described below.

The recording device 12 settings that must be made when a recording device 12 is added to the store system 11 are referred to below as "environmental settings," and registering the required settings in the recording device 12 is referred to as "configuring the environmental settings." Installing device drivers, applications, and other programs in the recording device 12 is included in configuring the environmental settings.

Configuring the environmental settings of the recording device 12 is done in two stages. Configuring the environmental settings of the recording device 12 in the first stage is done with the recording device 12 connected to a setup network SN (second network), which is a network separate from the local area network LN. Configuring the environmental settings in the next stage is done with the recording device 12 connected to the local area network LN (first network).

The setup network SN is deployed in the factory from which the recording device 12 is shipped, a facility operated by a systems integrator that maintains the store system 11, or an area in the store where the recording device 12 and other devices are serviced or maintained, for example.

Figure 4:
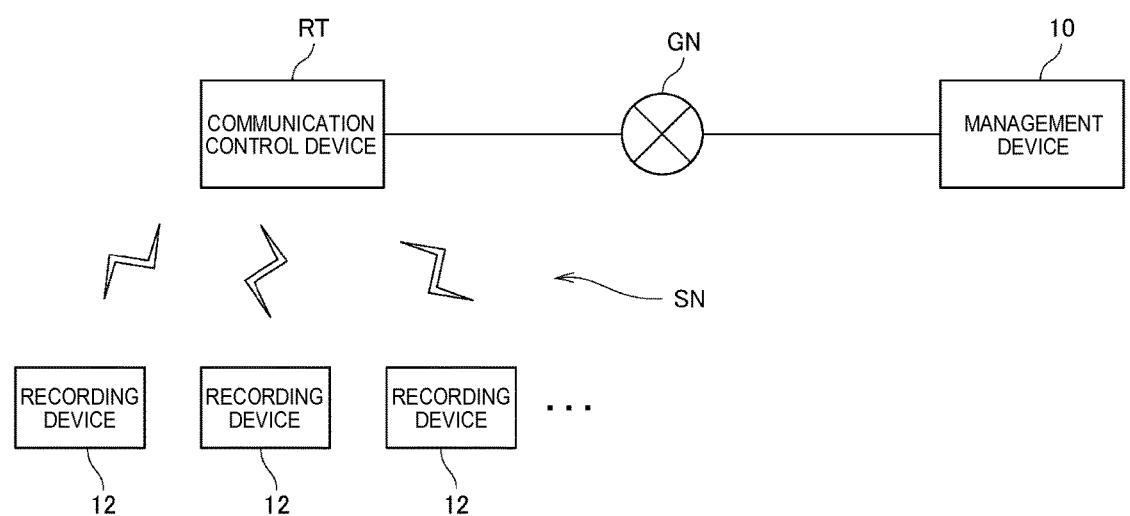
FIG. 4 illustrates a network for configuring recording devices.

FIG. 4 illustrates the setup network SN.

The setup network SN includes a communication control device RT. The communication control device RT includes a modem (or ONU (Optical Network Unit)), router, NAT (Network Address Translation) function, and DHCP (Dynamic Host Configuration Protocol) server capabilities. The communication control device RT relays data that is sent and received between devices when a device that connects to the setup network SN and a device that connects to the network GN communicate with each other. The communication control device RT includes the functions of a wireless LAN router, and communicates wirelessly with devices connected to the setup network SN according to a specific wireless communication protocol compatible with the wireless LAN.

Note that the communication control device RT is represented by a single block in FIG. 4, but the communication control device RT may be embodied by plural devices with different functions.

Figure 5:
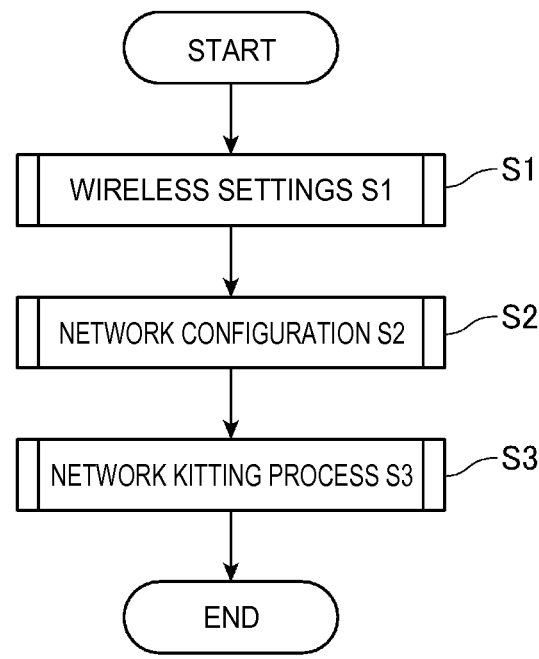
FIG. 5 shows the flow of configuring environmental settings.

Configuring the environmental settings of the recording device 12 is done in the order shown in the flow chart in FIG. 5. More specifically, configuring the environmental settings of the recording device 12 is done in the order of wireless settings S1 (step S1), network configuration S2 (step S2), and network kitting S3 (step S3).

The wireless settings S1 enable wireless communication by the recording device 12 on the setup network SN, and are environmental settings enabling the recording device 12 and the communication control device RT to communicate wirelessly.

The network configuration S2 process configures settings related to communication by the recording device 12 over the network GN, and configures environmental settings enabling the recording device 12 and the management device 10 to communicate.

In the network kitting S3 process, the recording device 12 acquires environmental settings information from the management device 10, and configures the environmental settings based on the environmental settings information.

During configuration of the environmental settings, the recording device 12 records information related to the environmental settings on roll paper and guides the user as appropriate. The user is previously provided with a list of setting (configuration) barcodes (described below) for different print media.

Figure 6:
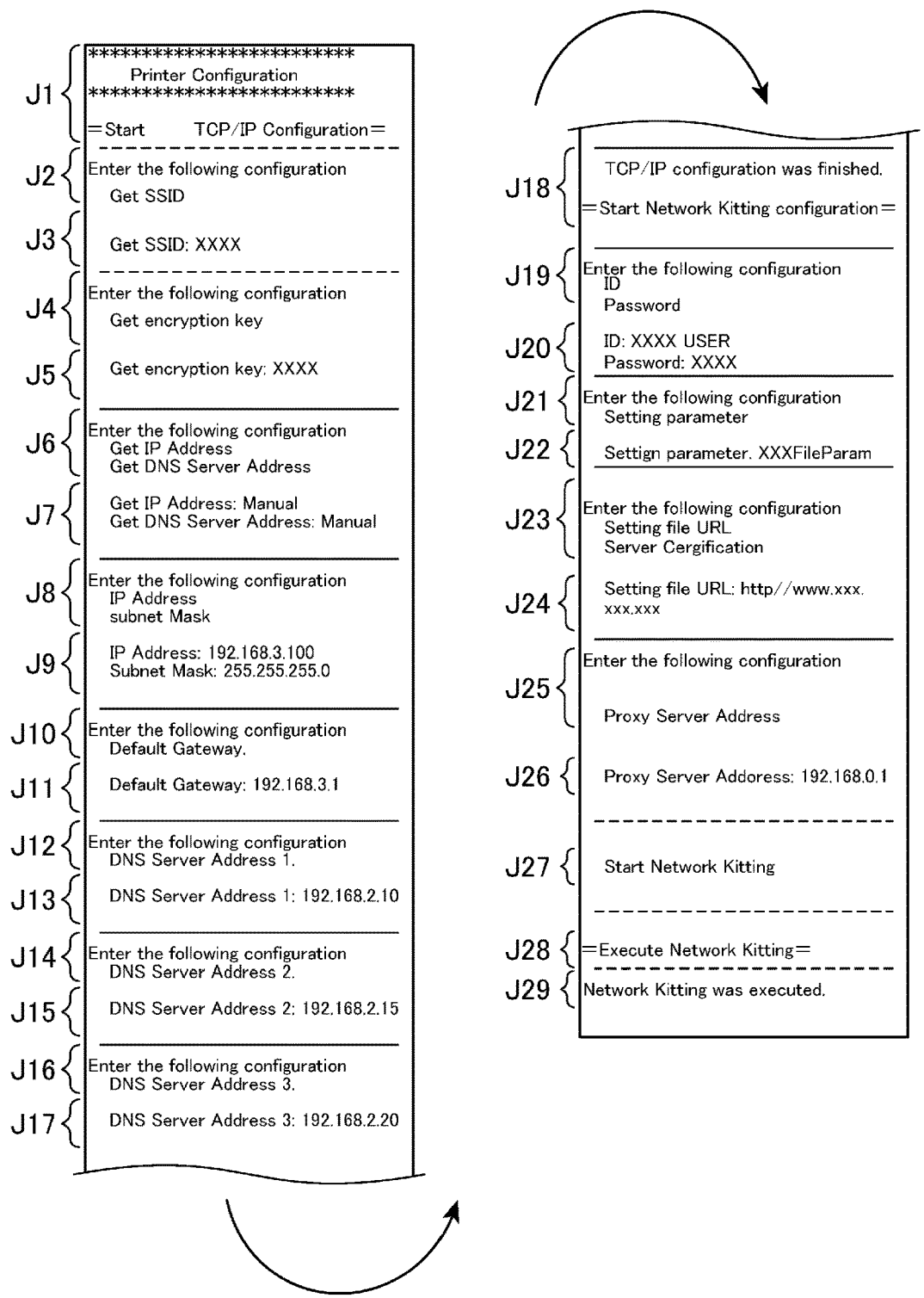
FIG. 6 illustrates information recorded by the recording device during configuration of the environmental settings.

FIG. 6 shows an example of information the recording device 12 records on roll paper during the environmental settings configuration process. The information is recorded step by step from top to bottom in the example shown in FIG. 6.

Figure 7:
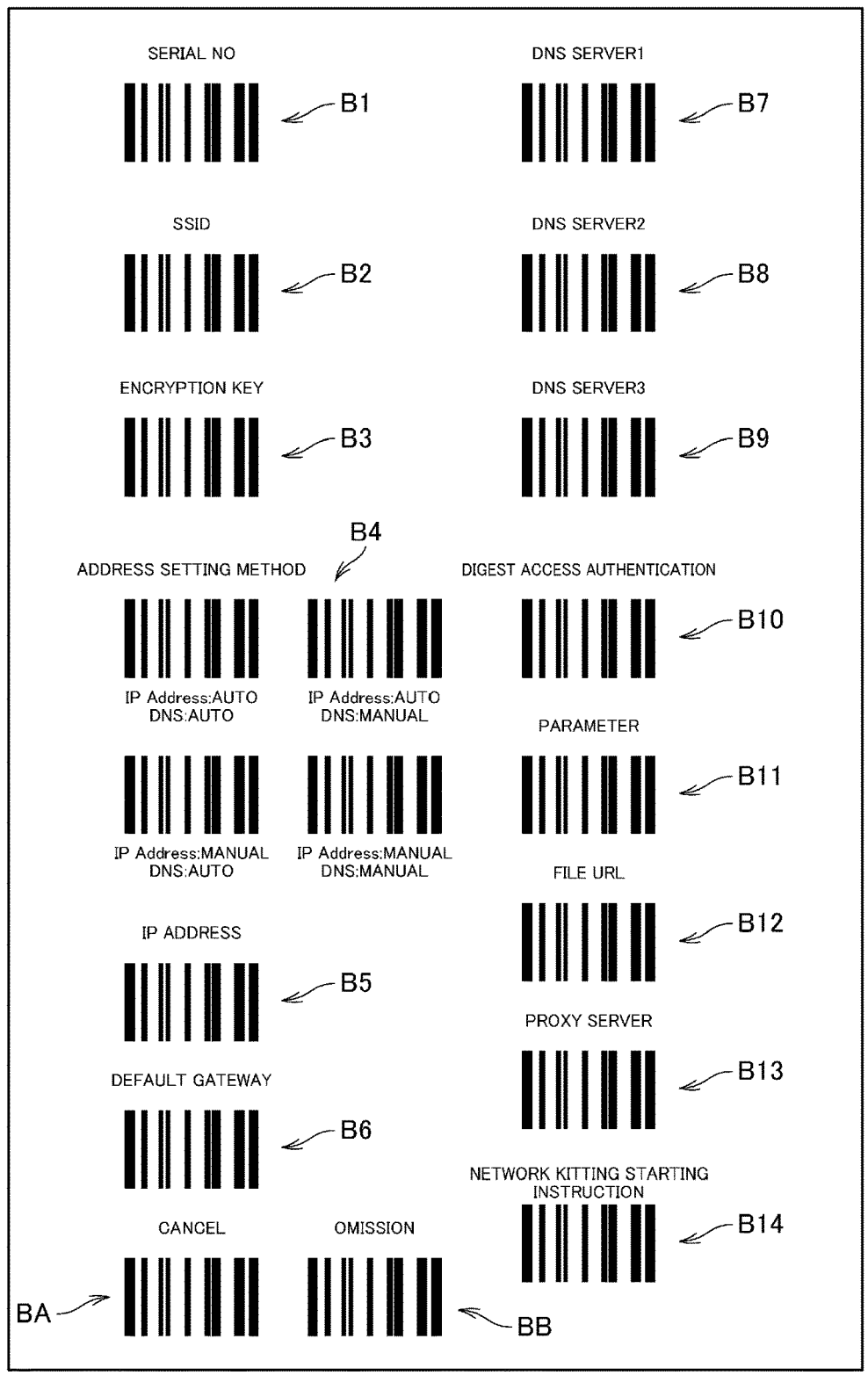
FIG. 7 shows a list of setting barcodes.

FIG. 7 shows an example of a list of setting barcodes.

To configure the environmental settings, the user references the information recorded on roll paper, and can complete the task of configuring the environmental settings easily and reduce configuration errors by using the provided list of setting barcode. Users with little technical knowledge can also complete the task of configuring the environmental settings easily by using the provided list of setting barcodes.

The wireless settings S1, network configuration S2, and network kitting S3 processes are described sequentially below while also referring to FIG. 6 and FIG. 7.

Note that in the operation described below, a barcode reader BR is already connected to the recording device 12. A device driver for the barcode reader BR is also previously installed to the recording device 12, and the recording device 12 can control the barcode reader BR.

As described below, the user reads barcodes included in the list of setting barcodes with the barcode reader BR. A Cancel barcode BA is printed in the list of setting barcodes. The user can cancel any settings that are made and restart the process from the beginning by reading the Cancel barcode BA at the appropriate time.

Wireless Settings S1

The wireless settings S1 are described first.

Figure 8:
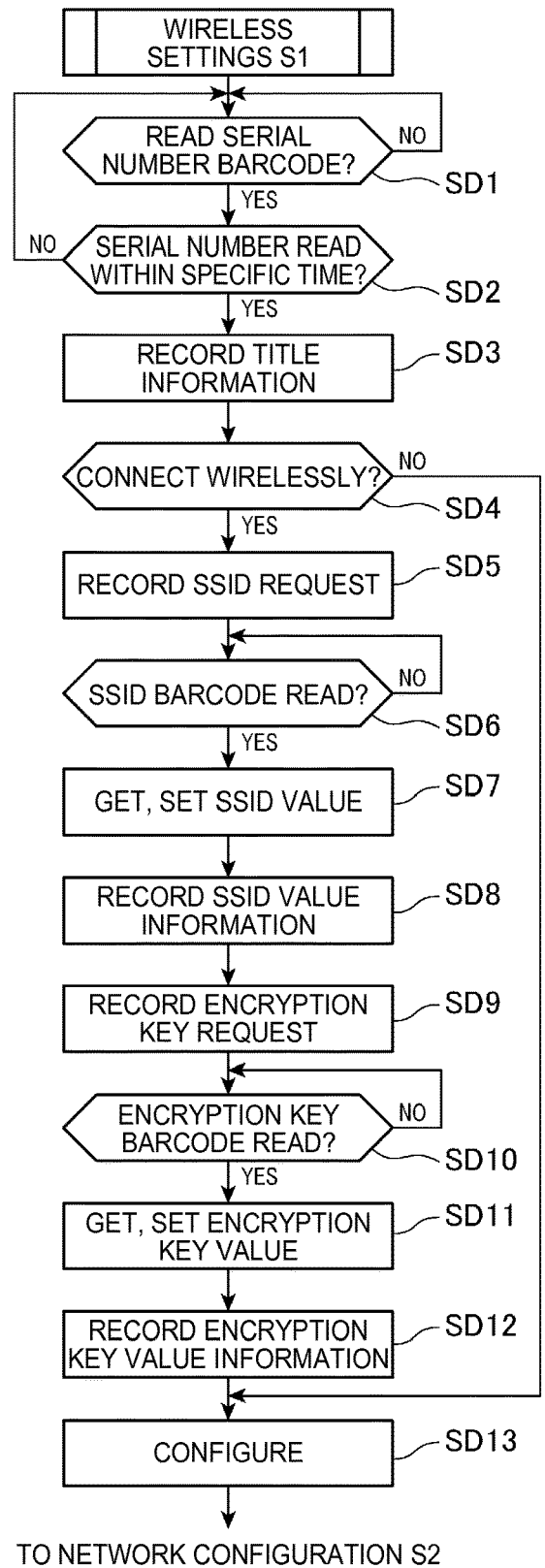
FIG. 8 is a flow chart of the operation of the recording device.

FIG. 8 is a flow chart of the operation of the recording device 12 when configuring the wireless settings S1.

To start configuring the wireless settings S1, the user uses the barcode reader BR to read the serial number barcode B1 included in the list of setting barcodes twice within a specific time (such as 10 seconds). Note that the user is previously instructed to scan the serial number barcode B1 twice within a specific time to start the wireless settings S1 process.

The serial number is an identification number assigned uniquely to each recording device 12 when the recording device 12 is manufactured. The serial number is printed in the serial number barcode B1.

The serial number may also be printed as human-readable text with the serial number barcode B1. For example, if there are multiple recording devices to set up, there are as many lists of setting barcodes as there are recording devices to configure. By printing a human-readable version of the serial number, each recording device can be easily matched to the corresponding list of setting barcodes.

As shown in FIG. 8, the control unit 30 of the recording device 12 monitors whether or not the serial number barcode B1 was read twice within the specific time (step SD1, step SD2). If the serial number barcode B1 was read twice within the specific time (step SD2 returns YES), the control unit 30 proceeds to step SD3.

Note that the serial number is input to the control unit 30 when the serial number barcode B1 is read. The control unit 30 determines if the input information is a serial number based on specific serial number rules, for example. Alternatively, information indicating that the information recorded in the barcode is a serial number may be included in the serial number barcode B1, and the control unit 30 may be configured to determine if the input information is a serial number based on this added information.

Using reading the serial number barcode B1 twice within a specific time as the trigger for starting the wireless settings S1 process has the following effect. Specifically, this prevents the wireless settings S1 process from starting as a result of the user accidentally reading the serial number barcode B1 with the barcode reader BR.

In step SD3, the control unit 30 controls the recording unit 31 to record the title information J1. As shown in FIG. 6, the title information J1 is information showing that configuring the environmental settings, including the wireless settings S1, has started. By seeing that the title information J1 was recorded, the user knows that the environmental settings process started normally.

Next, the control unit 30 determines whether or not to connect to the setup network SN wirelessly (step SD4). The user previously registers in the configuration file of the recording device 12 whether or not to connect to the setup network SN by wire or wirelessly, and the control unit 30 makes the decision in step SD4 based on this setting. Note that the control unit 30 may alternatively make the decision of step SD4 based on the status of the recording device 12.

For example, if a LAN cable is not connected to a specific port, the control unit 30 may decide to open a wireless connection.

If the recording device 12 does not connect to the setup network SN wirelessly (step SD4 returns NO), the control unit 30 skips to step SD13.

If the recording device 12 connects to the setup network SN wirelessly (step SD4 returns YES), the control unit 30 controls the recording unit 31 to record an SSID (Service Set Identifier) request J2 (step SD5).

As shown in FIG. 6, a SSID request J2 is information instructing the user to use the barcode reader BR to read the barcode (SSID barcode B2 in FIG. 7) related to the SSID (a configuration parameter) set by the communication control device RT functioning as an access point. By reading the SSID request J2, the user knows that the SSID setting is to be configured and the SSID barcode B2 must be read.

Below, the value set as the SSID is called the SSID value (parameter value), and is differentiated from the SSID configuration parameter. The SSID value to be set is printed in the SSID barcode B2 recorded in the list of setting barcodes.

After recording the SSID request J2, the control unit 30 monitors if the SSID barcode B2 was read and the SSID value was input (step SD6).

If the SSID value was input (step SD6 returns YES), the control unit 30 gets the SSID value from the input, and sets the SSID based on the acquired SSID value (step SD7).

Next, the control unit 30 controls the recording unit 31 to record the SSID value information J3 (step SD8).

As shown in FIG. 6, the SSID value information J3 is information indicating that the SSID was set based on reading the SSID barcode B2, and showing the SSID value that was set. By reading the SSID value information J3, the user knows that setting the SSID was completed and the SSID value that was set.

Next, the control unit 30 controls the recording unit 31 to record an encryption key request J4 (step SD9).

As shown in FIG. 6, the encryption key request J4 is information instructing the user to read the barcode (encryption key barcode B3 in FIG. 7) related to the encryption key for communicating wirelessly with the communication control device RT functioning as the access point with the barcode reader BR. By reading the encryption key request J4, the user knows that the encryption key will be configured and the encryption key barcode B3 must be read.

The value set as the encryption key is referred to below as the encryption key value (parameter value), and is differentiated from the encryption key as a configuration parameter (setting). The encryption key value to be set is printed in the encryption key barcode B3 recorded in the list of setting barcodes.

After recording the encryption key request J4, the control unit 30 monitors if the encryption key barcode B3 was read and the encryption key value was input (step SD10).

If the encryption key value was input (step SD10 returns YES), the control unit 30 gets the encryption key value based on the input, and sets the encryption key based on the acquired encryption key value (step SD11).

Next, the control unit 30 controls the recording unit 31 to record the encryption key value information J5 (step SD12).

As shown in FIG. 6, the encryption key value information J5 is information indicating that the encryption key was set based on reading the encryption key barcode B3 with the barcode reader BR, and shows the encryption key value that was set. By reading the encryption key value information J5, the user knows that the encryption key was set and the value that was set as the encryption key.

Note that a configuration that for security does not record the encryption key value is also conceivable. In this event, information indicating that the encryption key value was set may be recorded instead of the encryption key value itself.

In step SD13, the control unit 30 establishes a state enabling wireless communication with the communication control device RT based on the wireless communication settings configured as described above.

Next, the control unit 30 ends the wireless settings S1 process and goes to the network configuration S2 process.

Network Configuration S2

The network configuration S2 process is described next.

Figure 9:
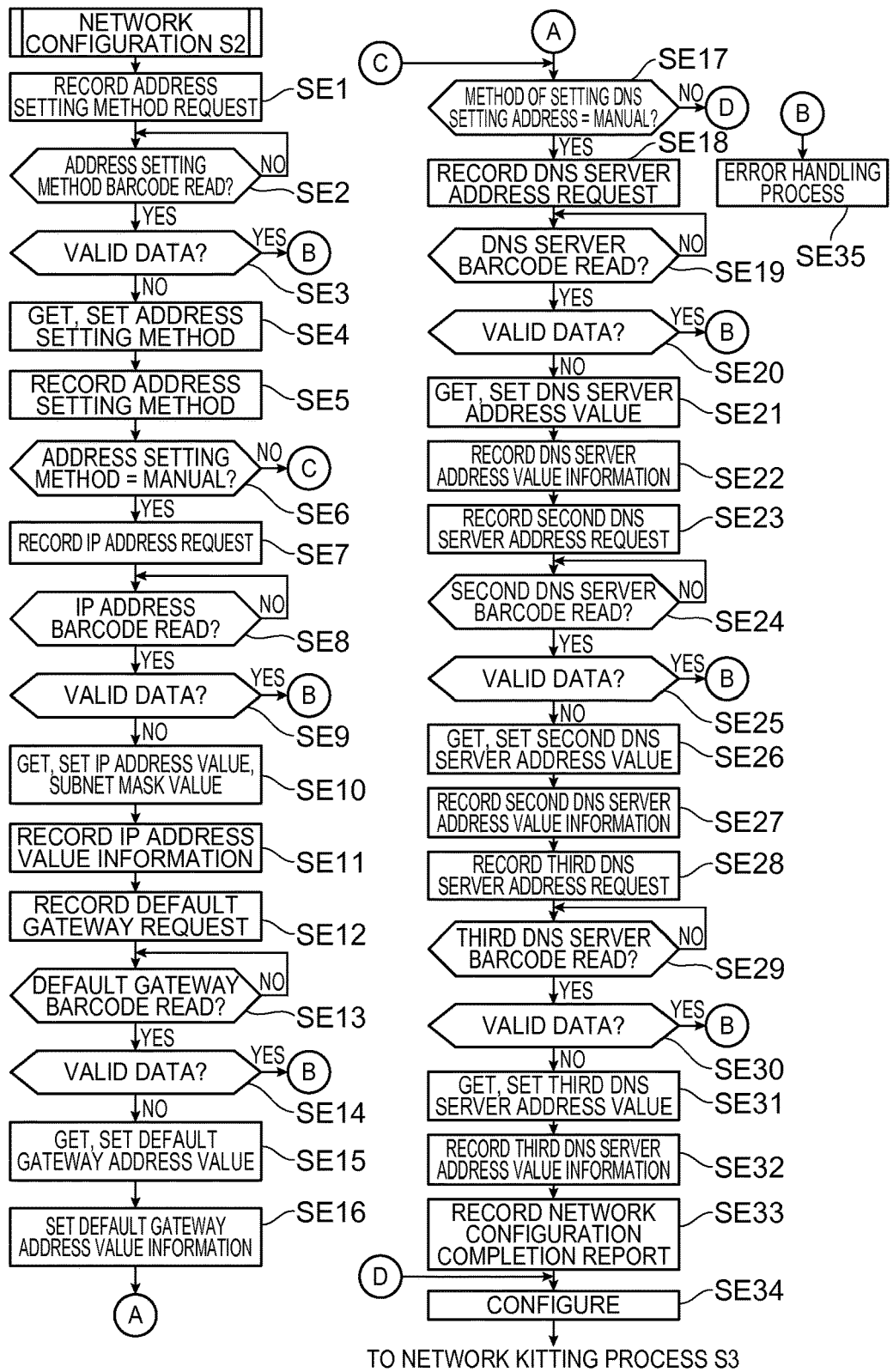
FIG. 9 is a flow chart of the operation of the recording device.

FIG. 9 is a flow chart showing the operation of the recording device 12 in the network configuration S2 process.

As in the wireless settings S1 process described above, the values for various parameters are set by reading barcodes with the barcode reader BR. An Omission barcode BB is also printed in the list of setting barcodes as shown in FIG. 7. The user can omit setting a value for the particular configuration parameter being processed by reading the Omission barcode BB with the barcode reader BR at the appropriate time.

As shown in FIG. 9, the control unit 30 controls the recording unit 31 to record the address setting method request J6 (step SE1).

As shown in FIG. 6, the address setting method request J6 is information instructing reading the barcode (address setting method barcode B4 in FIG. 7) related to the method of setting the address (configuration parameter) with the barcode reader BR. By reading the address setting method request J6, the user knows that the method of setting the address will be set, and that the address setting method barcode B4 must be read.

The address setting includes the IP address setting related to the IP address, subnet mask and default gateway, and the DNS address setting related to setting the address of the DNS (Domain Name System) server. The methods of setting the IP address settings and the DNS settings are automatic using the DHCP server function of the communication control device RT, and manual. As shown in FIG. 7, the address setting method barcodes B4 include a barcode for automatically configuring both the IP address settings and the DNS settings; a barcode for automatically configuring the IP address settings and manually configuring the DNS settings; a barcode for manually configuring the IP address settings and automatically configuring the DNS settings; and a barcode for manually configuring both the IP address settings and the DNS settings.

The method (parameter value) of configuring the IP address settings is set to automatic or manual. The method (parameter value) of configuring the DNS settings is set to automatic or manual. The value indicating the automatic or manual setting method is referred to below as the "address setting method value" and is differentiated from the address setting method as a configuration parameter.

After recording the address setting method request J6, the control unit 30 monitors if one of the address setting method barcodes B4 was read and information based on the read barcode was input (step SE2).

If information was input (step SE2 returns YES), the control unit 30 determines if the input information is bad information (step SE3). Bad information is information that is invalid as a value for configuring the setting to be made.

For example, bad information is input to the control unit 30 if the user reads the wrong barcode with the barcode reader BR.

If the input information is bad information (step SE3 returns YES), the control unit 30 executes an appropriate process (step SE35). For example, the control unit 30 may control the recording unit 31 to record information indicating that bad information was input. Based on the recorded information, the user can know that the wrong barcode was read, and can input information again by scanning the Cancel barcode BA with the barcode reader BR, for example.

If the input information is not bad information (step SE3 returns NO), the control unit 30 acquires the address setting method value of the IP address setting method and the DNS setting method based on the input, and configures the IP address setting and the DNS setting based on the acquired address setting method value (step SE4).

Next, the control unit 30 controls the recording unit 31 to record the address setting method value information J7 (step SE5).

As shown in FIG. 6, the address setting method value information J7 is information indicating that the address setting method value was set based on reading the address setting method barcode B4 with the barcode reader BR, and the address setting method value that was set. Based on the address setting method value information J7, the user can know that configuring the method of setting the address was completed and the value that was set for the address setting method.

After recording the address setting method value information J7, the control unit 30 determines if the address setting method value set in step SE4 for the method of setting the IP address is Manual (step SE6).

If not Manual (step SE6 returns NO), the control unit 30 goes to step SE17.

If Manual (step SE6 returns YES), the control unit 30 controls the recording unit 31 to record an IP address request J8 (step SE7).

As shown in FIG. 6, the IP address request J8 is information instructing reading the barcode (IP address barcode B5 in FIG. 7) related to the IP address (configuration parameter) and subnet mask (configuration parameter) with the barcode reader BR. By reading the IP address request J8, the user knows that the IP address and subnet mask will be configured, and the IP address barcode B5 must be read.

Below, the value set as the IP address is called the IP address value (parameter value), and is differentiated from the IP address as a configuration parameter. The value set as the subnet mask is called the subnet mask value (parameter value), and is differentiated from the subnet mask as a configuration parameter. The IP address value and the subnet mask value to be set are printed in the IP address barcode B5 recorded in the list of setting barcodes.

As described above, the recording device 12 is connected to the local area network LN (first network) for use in the store system 11, and is connected to the setup network SN (second network) before being installed to the store system 11. Because the local area network LN and the setup network SN are different networks, the IP address and subnet mask to be set in the recording device 12 are different for each network.

The IP address (second address) and the subnet mask used on the setup network SN are set in the recording device 12 in the network configuration S2 process.

After recording the IP address request J8, the control unit 30 monitors whether or not the IP address barcode B5 was read and the IP address value and the subnet mask value were input (step SE8).

If the IP address value and the subnet mask value were input (step SE8 returns YES), the control unit 30 determines if the input information is bad information (step SE9).

If the input information is bad information (step SE9 returns YES), the control unit 30 executes an appropriate process (step SE35).

If the input information is not bad information (step SE9 returns NO), the control unit 30 acquires the IP address value and subnet mask value based on the input, and sets the IP address and subnet mask based on the acquired IP address value and the subnet mask value (step SE10).

Next, the control unit 30 controls the recording unit 31 to record the IP address value information J9 (step SE11).

As shown in FIG. 6, the IP address value information J9 is information indicating that the IP address and subnet mask were set based on reading the IP address barcode B5 with the barcode reader BR, and identifying the IP address value and subnet mask value that were set. By reading the IP address value information J9, the user knows that setting the IP address and subnet mask are completed, and knows the IP address value and subnet mask value that were set.

Next, the control unit 30 controls the recording unit 31 to record the default gateway request J10 (step SE12).

As shown in FIG. 6, the default gateway request J10 is information instructing reading the barcode (default gateway barcode B6 in FIG. 7) related to the default gateway address (configuration parameter) with the barcode reader BR. By reading the default gateway request J10, the user knows that the default gateway address will be set, and that the default gateway barcode B6 must be read.

Below, the value set as the default gateway address is called the default gateway address value (parameter value), and is differentiated from the default gateway address as a configuration parameter. The default gateway address value to be set is printed in the default gateway barcode B6 recorded in the list of setting barcodes.

Note that the address of the default gateway the recording device 12 accesses is different when the recording device 12 is connected to the local area network LN and when connected to the setup network SN.

The address of the default gateway used on the setup network SN is set in the recording device 12 in the network configuration S2 process.

After recording the default gateway request J10, the control unit 30 monitors whether or not the default gateway barcode B6 was read and the default gateway address value was input (step SE13).

If the default gateway address value was input (step SE13 returns YES), the control unit 30 determines if the input information is bad information (step SE14).

If the input information is bad information (step SE14 returns YES), the control unit 30 executes an appropriate process (step SE35).

If the input information is not bad information (step SE14 returns NO), the control unit 30 acquires the default gateway address value based on the input and sets the default gateway address based on the acquired default gateway address value (step SE15).

Next, the control unit 30 controls the recording unit 31 to record the default gateway address value information J11 (step SE16).

As shown in FIG. 6, the default gateway address value information J11 is information indicating that the default gateway address was set based on reading the default gateway barcode B6 with the barcode reader BR, and identifying the default gateway address value that was set. By reading the default gateway address value information J11, the user knows that setting the default gateway address is completed, and knows the value that was set as the default gateway address.

In step SE17, the control unit 30 determines if the method of setting the address in the DNS setting that was set in step SE4 is Manual.

If the setting is not Manual (step SE17 returns NO), the control unit 30 goes to step SE34.

If the setting is Manual (step SE17 returns YES), the control unit 30 controls the recording unit 31 to record the DNS server address request J12 (step SE18).

As shown in FIG. 6, DNS server address request J12 is information instructing reading the barcode (DNS server barcode B7 in FIG. 7) related to the DNS server address (configuration parameter) with the barcode reader BR. By reading the DNS server address request J12, the user knows that the DNS server address will be configured, and the DNS server barcode B7 must be read.

Below, the value set as the DNS server address is called the DNS server address value (parameter value), and is differentiated from the DNS server address as a configuration parameter. The DNS server address value to be set is printed in the DNS server barcode B7 recorded in the list of setting barcodes.

Note that the address of the DNS server the recording device 12 accesses is different when the recording device 12 is connected to the local area network LN and when connected to the setup network SN.

The address of the DNS server used on the setup network SN is set in the recording device 12 in the network configuration S2 process.

After recording the DNS server address request J12, the control unit 30 monitors whether or not the DNS server barcode B7 was read and the DNS server address value was input (step SE19).

If the DNS server address value was input (step SE19 returns YES), the control unit 30 determines if the input information is bad information (step SE20).

If the input information is bad information (step SE20 returns YES), the control unit 30 executes an appropriate process (step SE35).

If the input information is not bad information (step SE20 returns NO), the control unit 30 acquires the DNS server address value based on the input, and sets the address of the DNS server based on the acquired DNS server address value (step SE21).

Next, the control unit 30 controls the recording unit 31 to record the DNS server address value information J13 (step SE22)

As shown in FIG. 6, the DNS server address value information J13 is information indicating that the DNS server address was set based on reading the DNS server barcode B7 with the barcode reader BR, and identifying the DNS server address value that was set. By reading the DNS server address value information J13, the user knows that setting the DNS server address is completed, and knows the value that was set as the DNS server address.

The same process executed in step SE18 to step SE22 is executed in step SE23 to step SE27, and is therefore described briefly below.

When there are redundant DNS servers and the recording device 12 can access any of multiple DNS servers in step SE18 to step SE22, the address of the DNS server the recording device 12 accesses second is also set. For example, if communication with the first DNS server is not possible, or a cache linking domain names to access with the corresponding IP addresses is not stored on the first DNS server, the recording device 12 accesses the second DNS server.

The control unit 30 records a second DNS server address request J14 (FIG. 6) and instructs reading the second DNS server barcode B8 (FIG. 7) recorded in the list of setting barcodes. When the second DNS server barcode B8 is read, the control unit 30 records the second DNS server address value information J15 (FIG. 6), telling the user that the setting is complete.

The same process executed in step SE23 to step SE27 is executed in step SE28 to step SE32, and is therefore described briefly below.

The address of the DNS server to access third is set in step SE28 to step SE32.

The control unit 30 records a third DNS server address request J16 (FIG. 6) and instructs reading the third DNS server barcode B9 (FIG. 7) recorded in the list of setting barcodes. When the third DNS server barcode B9 is read, the control unit 30 records the third DNS server address value information J17 (FIG. 6), telling the user that the setting is complete.

In step SE33, the control unit 30 controls the recording unit 31 to record the network configuration completion report J18. As shown in FIG. 6, the network configuration completion report J18 is information indicating that the network configuration S2 process is complete. By reading the printed network configuration completion report J18, the user knows that the network configuration S2 process is completed.

In step SE34, the control unit 30 establishes a communication connection with the management device 10 through the communication control device RT based on the configuration settings described above.

Next, the control unit 30 ends the network configuration S2 process, and starts the network kitting S3 process.

Network Kitting S3

The network kitting S3 process is described next.

Figure 10:
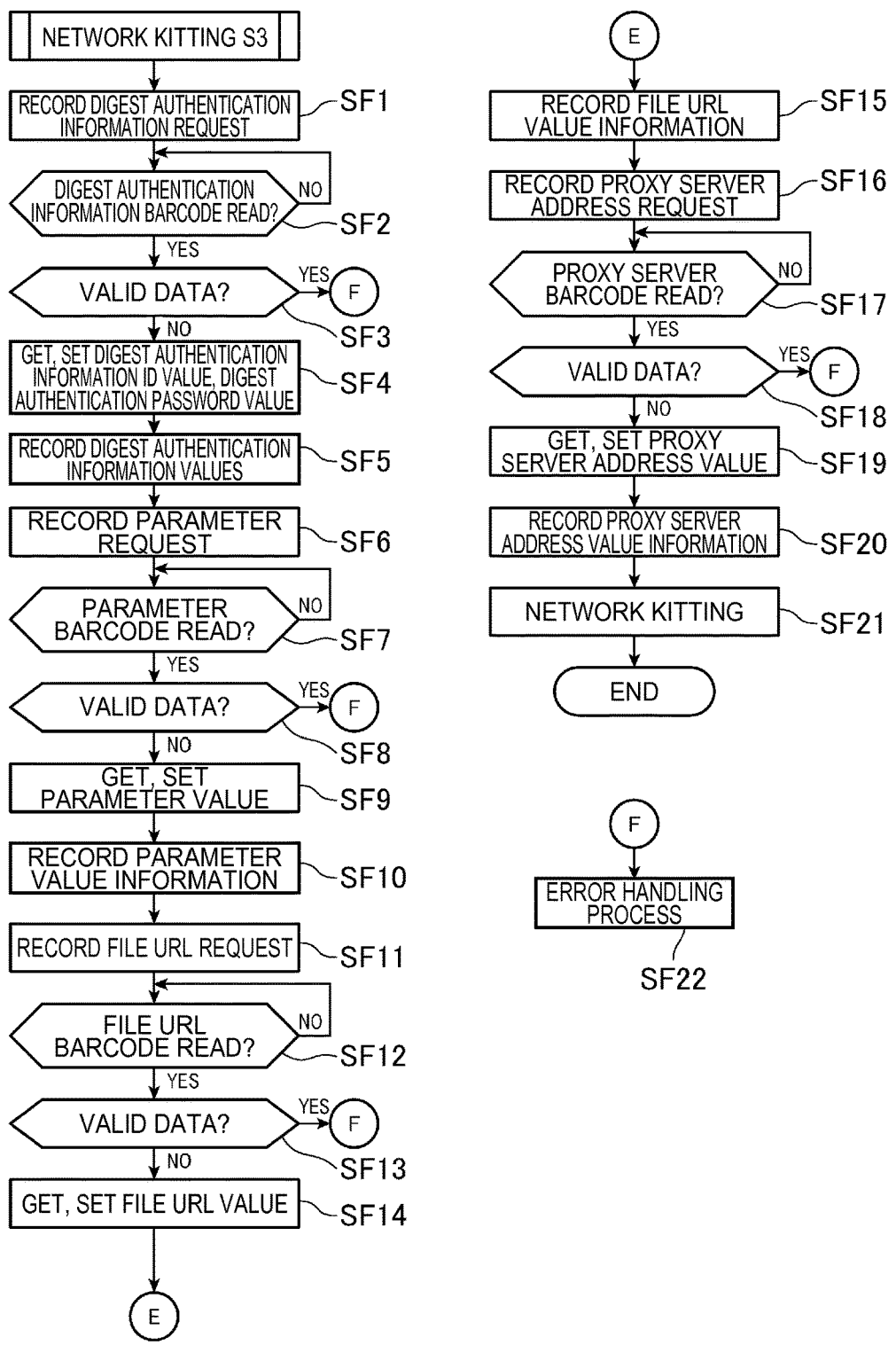
FIG. 10 is a flow chart of the operation of the recording device.

FIG. 10 is a flow chart of the operation of the recording device 12 in the network kitting S3 process.

As shown in FIG. 10, the control unit 30 controls the recording unit 31 to record the Digest authentication information request J19 (step SF1).

As shown in FIG. 6, the Digest authentication information request J19 is information instructing reading the barcode (Digest access authentication barcode B10 in FIG. 7) related to the Digest authentication ID (configuration parameter) and the Digest authentication password (configuration parameter) with the barcode reader BR. By reading the Digest authentication information request J19, the user knows that the Digest authentication ID and the Digest authentication password will be set, and that the Digest access authentication barcode B10 must be read.

Note that the Digest authentication ID and the Digest authentication password are the ID and password used for HTTP authentication when the recording device 12 requests access to the management device 10 functioning as an HTTP (Hypertext Transfer Protocol) server.

Below, the value set as the Digest authentication ID is called the Digest authentication ID value (parameter value), and is differentiated from the Digest authentication ID as a configuration parameter. The value set as the Digest authentication password is called the Digest authentication password value (parameter value), and is differentiated from the Digest authentication password as a configuration parameter. The Digest authentication ID value and the Digest authentication password value to be set are printed in the Digest access authentication barcode B10 recorded in the list of setting barcodes.

After recording the Digest authentication information request J19, the control unit 30 monitors if the Digest access authentication barcode B10 was read and the Digest authentication ID value and the Digest authentication password value were input (step SF2).

If the Digest authentication ID value and the Digest authentication password value were input (step SF2 returns YES), the control unit 30 determines if the input information is bad information (step SF3).

If the input information is bad information (step SF3 returns YES), the control unit 30 executes an appropriate process (step SF22).

If the input information is not bad information (step SF3 returns NO), the control unit 30 acquires the Digest authentication ID value and the authentication password value based on the input, and sets the Digest authentication ID and the Digest authentication password based on the acquired Digest authentication ID value and Digest authentication password value (step SF4).

Next, the control unit 30 controls the recording unit 31 to record the Digest authentication value information J20 (step SF5).

As shown in FIG. 6, the Digest authentication value information J20 is information indicating that the Digest authentication ID and the Digest authentication password were set based on reading the Digest access authentication barcode B10 with the barcode reader BR, and identifying the values that were set as the Digest authentication ID and the Digest authentication password. By reading the Digest authentication value information J20, the user knows that setting the Digest authentication ID and the Digest authentication password is completed, and knows the values that were set as the Digest authentication ID and the Digest authentication password.

Next, the control unit 30 controls the recording unit 31 to record the parameter request J21 (step SF6).

As shown in FIG. 6, the parameter request J21 is information instructing reading the barcode (parameter barcode B11 in FIG. 7) related to a parameter (parameter setting) with the barcode reader BR. By reading the parameter request J21, the user knows that a parameter will be set, and that the parameter barcode B11 must be read.

Note that this parameter is information written in a URL as a URL query parameter when the recording device 12 accesses a URL on the management device 10. When accessed, the management device 10 can execute an appropriate process based on the URL query parameter.

Below, the value set for the parameter is called the parameter value (parameter value), and is differentiated from the parameter as a configuration parameter. The parameter value to be set is printed in the parameter barcode B11 recorded in the list of setting barcodes.

After recording the parameter request J21, the control unit 30 monitors whether or not the parameter barcode B11 was read and the parameter value was input (step SF7).

If the parameter value was input (step SF7 returns YES), the control unit 30 determines if the input information is bad information (step SF8).

If the input information is bad information (step SF8 returns YES), the control unit 30 executes an appropriate process (step SF22).

If the input information is not bad information (step SF8 returns NO), the control unit 30 acquires the parameter value based on the input, and sets the parameter based on the acquired parameter value (step SF9).

Next, the control unit 30 controls the recording unit 31 to record the parameter value information J22 (step SF10).

As shown in FIG. 6, the parameter value information J22 is information indicating that the parameter was set based on reading the parameter barcode B11 with the barcode reader BR, and identifying the parameter value that was set. By reading the parameter value information J22, the user knows that setting the parameter is completed, and knows the parameter value that was set.

Next, the control unit 30 controls the recording unit 31 to record the file URL request J23 (step SF11).

As shown in FIG. 6, the file URL request J23 is information instructing reading the barcode (file URL barcode B12 in FIG. 7) related to the file URL with the barcode reader BR. By reading the file URL request J23, the user knows that the file URL will be configured, and the file URL barcode B12 must be read.

Note that the file URL is the URL on the management device 10 the recording device 12 accesses to acquire the environmental settings information file KF (environmental settings information) described below. Based on the acquired environmental settings information file KF, the recording device 12 configures specific environmental settings.

Below, the value set as the file URL is called the file URL value (parameter value), and is differentiated from the file URL as a configuration parameter. The value of the file URL to be set is printed in the file URL barcode B12 recorded in the list of setting barcodes.

After recording the file URL request J23, the control unit 30 monitors whether or not the file URL barcode B12 was read and the file URL value was input (step SF12).

If the file URL was input (step SF12 returns YES), the control unit 30 determines if the input information is bad information (step SF13).

If the input information is bad information (step SF13 returns YES), the control unit 30 executes an appropriate process (step SF22).

If the input information is not bad information (step SF13 returns NO), the control unit 30 acquires the file URL value based on the input, and sets the file URL based on the acquired file URL value (step SF14).

In step SF15, the control unit 30 controls the recording unit 31 to record the file URL value information J24 (step SF15).

As shown in FIG. 6, the file URL value information J24 is information indicating that the file URL was set based on reading the file URL barcode B12 with the barcode reader BR, and identifying the file URL value that was set. By reading the file URL value information J24, the user knows that setting the file URL is completed, and knows the value that was set as the file URL.

Next, the control unit 30 controls the recording unit 31 to record the proxy server address request J25 (step SF16).

As shown in FIG. 6, the proxy server address request J25 is information instructing reading the barcode (proxy server barcode B13 in FIG. 7) related to the address (parameter setting) of the proxy server with the barcode reader BR. By reading the proxy server address request J25, the user knows that the proxy server address will be set, and that the proxy server barcode B13 must be read.

Note that the proxy server address is the address of the proxy server to access when a proxy server is connected to the setup network SN, and a device on a network outside the setup network SN is communicated with through the proxy server.

Below, the value set as the proxy server address is called the proxy server address value (parameter value), and is differentiated from the proxy server address as a configuration parameter. The proxy server address value to be set is printed in the proxy server barcode B13 recorded in the list of setting barcodes.

Note that the user can omit setting the proxy server address by reading the Omission barcode BB with the barcode reader BR. The user reads the Omission barcode BB and omits setting the proxy server address When the recording device 12 accesses an external network without going through a proxy server.

After recording the proxy server address request J25, the control unit 30 monitors whether or not the proxy server barcode B13 was read and the proxy server address value was input (step SF17).

If the proxy server address was input (step SF17 returns YES), the control unit 30 determines if the input information is bad information (step SF18).

If the input information is bad information (step SF18 returns YES), the control unit 30 executes an appropriate process (step SF22).

If the input information is not bad information (step SF18 returns NO), the control unit 30 acquires the proxy server address value based on the input, and sets the proxy server address based on the acquired proxy server address value (step SF19).

Next, the control unit 30 controls the recording unit 31 to record the proxy server address value information J26 (step SF20).

As shown in FIG. 6, the proxy server address value information J26 is information indicating that the address of the proxy server was set based on reading the proxy server barcode B13 with the barcode reader BR, and identifying the value that was set as the proxy server address. By reading the proxy server address value information J26, the user knows that setting the proxy server address is completed, and knows the value set as the proxy server address.

In step SF21, the control unit 30 communicates with the management device 10 based on the configured settings described above and executes the network kitting process.

Operation of the recording device 12 and the management device 10 during the network kitting process is described below.

Figure 11:
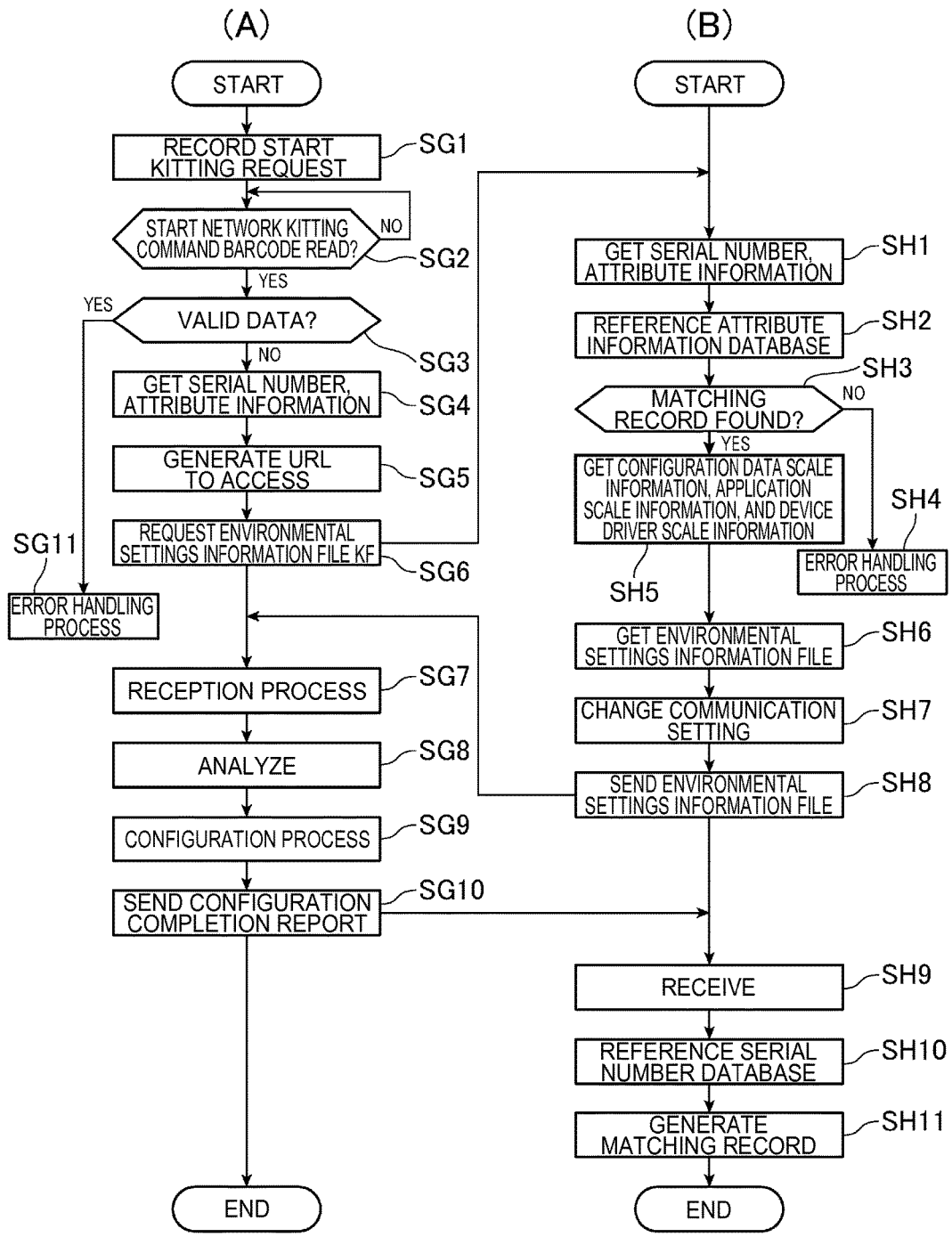
FIG. 11 is a flow chart of the operation of the recording device and management device.

FIG. 11 is a flow chart of the operation of the recording device 12 and the management device 10 during the network kitting process, (A) showing the operation of the recording device 12, and (B) showing the operation of the management device 10.

As shown in column (A) of FIG. 11, the control unit 30 of the recording device 12 controls the recording unit 31 to record the start kitting request J27 (step SG1).

As shown in FIG. 6, the start kitting request J27 is information instructing reading the barcode (start network kitting command barcode B14 in FIG. 7) instructing starting the network kitting process with the barcode reader BR. By reading the start kitting request J27, the user knows that the start network kitting command barcode B14 must be read to start the network kitting process.

In addition to information instructing starting the network kitting process, the serial number (identification information) and attribute information of the recording device 12 are printed in the start network kitting command barcode B14.

The attribute information is identification information identifying the store system 11 (business) where the recording device 12 is installed.

After recording the start kitting request J27, the control unit 30 monitors whether or not the start network kitting command barcode B14 was read, and if the information instructing starting the network kitting process, the serial number (identification information) of the recording device 12, and the attribute information of the recording device 12 were input (step SG2).

If there is input based on reading with the barcode reader BR (step SG2 returns YES), the control unit 30 determines if the input information is bad information (step SG3).

If the input information is bad information (step SG3 returns YES), the control unit 30 executes an appropriate process (step SG11).

If the input information is not bad information (step SG3 returns NO), the control unit 30 starts the network kitting process.

Based on the input information, the control unit 30 acquires the serial number of the recording device 12 and the attribute information of the recording device 12 (step SG4).

Next, the control unit 30 adds the parameter set in the network configuration S2, and the serial number and attribute information acquired in step SG4, as URL query parameters to the file URL set in the network configuration S2, and generates the URL to access (step SG5).

The URL generated by the control unit 30 in step SG5 is the URL of the management device 10 to access to acquire the environmental settings information file KF described below.

Next, the control unit 30 accesses the URL generated in step SG5, and requests the environmental settings information file KF (step SG6).

As shown in column (B) of FIG. 11, the management device control unit 60 of the management device 10 extracts the serial number and attribute information in the URL query parameter of the URL accessed by the recording device 12 (step SH1).

Next, the management device control unit 60 accesses the attribute information database DB1 stored by the management device storage unit 62 (step SH2).

Figure 12:
FIG. 12 shows an example of an attribute information database.

FIG. 12 shows the data structure of the attribute information database DB1.

As shown in FIG. 12, each record in the attribute information database DB1 contains attribute information, configuration data scale information, application scale information, and device driver scale information.

The store system 11 may be installed in stores (businesses) of different sizes, and the operating settings applied to the recording device 12 differ according to the scale of the business.

The operating settings are settings related to the operation of the recording device 12, and may include settings related to the operating mode when recording, settings related to the speed when recording, settings related to the density of the recorded images, and settings related to margins around recorded images. The operating settings are information containing plural combinations of configuration parameters and the values set for the configuration parameters. The operating settings are recorded in a configuration file stored by the recording device 12.

The functions to be enabled on the recording device 12 differ according to the scale of the business, and the applications to install on the recording device 12 therefore differ. The devices that connect to the recording device 12 also differ according to the scale of the business, and the device drivers to install on the recording device 12 therefore differ.

The configuration data scale information is information indicating whether the operating settings of the recording devices 12 installed in one store are to be configured for a large-scale store, configured for a mid-size store, or configured for a small-scale store.

The application scale information is information indicating whether applications installed in the recording devices 12 in one store are to be configured for a large-scale store, configured for a mid-size store, or configured for a small-scale store.

The device driver scale information is information indicating whether device drivers installed in the recording devices 12 in one store are to be configured for a large-scale store, configured for a mid-size store, or configured for a small-scale store.

The attribute information, configuration data scale information, application scale information, and device driver scale information are relationally stored to a particular store in the attribute information database DB1.

As shown in column (B) of FIG. 11, the management device control unit 60 determines if a record containing the attribute information acquired in step SH1 exists in the attribute information database DB1 (step SH3).

Note that the records in the attribute information database DB1 are registered in the database by a specific means, and a particular record may not exist for various reasons, including simply forgetting to save a particular record.

If the record does not exist (step SH3 returns NO), the management device control unit 60 reports the same to the recording device 12 (step SH4). While not shown in FIG. 11, the control unit 30 of the recording device 12 interrupts the network kitting process when the record does not exist, and controls the recording unit 31 to record a message indicating the network kitting process was aborted because the corresponding record (information) was not found in the attribute information database DB1. By reading this report, the user knows that network kitting was aborted and why, and based thereon can execute an appropriate process, including creating a corresponding record in the attribute information database DB1.

If a record containing the attribute information acquired in step SH1 is found in the attribute information database DB1 (step SH3 returns YES), the management device control unit 60 acquires from the located record the configuration data scale information, the application scale information, and the device driver scale information (step SH5).

Next, the management device control unit 60 acquires the configuration information file JF corresponding to the configuration data scale information acquired in step SH5. The management device control unit 60 also acquires the application configuration program file AF corresponding to the application scale information acquired in step SH5. The management device control unit 60 also acquires the device driver configuration program file DF corresponding to the device driver scale information acquired in step SH5 (step SH6).

The configuration information file JF is a file recording the operating settings described above and the communication settings. The communication settings are settings related to communication when the recording device 12 is connected to the local area network LN deployed in the store system 11, and includes at least settings related to the IP address, subnet mask, and default gateway address used on the local area network LN, and the DNS server address.

The management device storage unit 62 of the management device 10 stores a configuration information file JF recording operating information scaled to the store scale (large, mid-size, small) indicated by the configuration data scale information. In step SH6, the management device control unit 60 gets the configuration information file JF matching the scale indicated by the configuration data scale information from among the configuration information files JF stored by the management device storage unit 62.

The application configuration program file AF is the program file of an application to be installed on the recording device 12. There are plural program files when there are plural applications. The management device storage unit 62 of the management device 10 stores an application configuration program file AF containing the program file for the application matching the store scale for each store scale (large, mid-size, small) indicated by the application scale information. In step SH6, the management device control unit 60 gets the application configuration program file AF matching the store scale indicated by the application scale information from among the application configuration program files AF stored by the management device storage unit 62.

The device driver configuration program file DF is the program file of a device driver to be installed on the recording device 12. There are plural program files when there are plural device drivers to install. The management device storage unit 62 of the management device 10 stores a device driver configuration program file DF containing the program file for the device driver matching the store scale for each store scale (large, mid-size, small) indicated by the device driver scale information. In step SH6, the management device control unit 60 gets the device driver configuration program file DF matching the store scale indicated by the device driver scale information from among the device driver configuration program files DF stored by the management device storage unit 62.

Next, the management device control unit 60 changes the communication settings in the configuration information file JF acquired in step SH6 to the settings compatible with the local area network LN to which the recording device 12 is connected (step SH7). The communication settings before the settings are changed are the default settings in this example, and may be expected to not match the settings appropriate to the local area network LN to which the recording device 12 is connected.

Below, the IP address used on the local area network LN after the recording device 12 is installed in the store system 11 is referred to below as the IP address for the store, and is different from the IP address used on the setup network SN.

In step SH7, the management device control unit 60 sets the value of the IP address (IP address for the store) in the communication settings recorded in the configuration information file JF to a value that can be used on the local area network LN and is different from the IP address of any other recording device 12 in the same store. Note that when the IP address of the recording device 12 is set dynamically by a function of the DHCP server after the recording device 12 connects to the local area network LN, the management device control unit 60 sets the IP address for the store accordingly.

In step SH7, the management device control unit 60 sets the subnet mask, default gateway address, and DNS server address in the communication settings recorded in the configuration information file JF appropriately to the local area network LN of the store in which the recording device 12 is installed.

Next, the management device control unit 60 controls the management device network communication unit 61 to send the configuration information file JF, the application configuration program file AF and the device driver configuration program file DF to the recording device 12 (step SH8).

Below, the files sent by the management device control unit 60 in step SH8 are collectively referred to as the environmental settings information file KF. The environmental settings information file KF is equivalent to the environmental settings information.

As shown in column (A) of FIG. 11, the control unit 30 of the recording device 12 executes a reception process to receive the environmental settings information file KF from the management device (step SG7).

In the reception process of step SG7, the control unit 30 downloads the configuration information file JF, the application configuration program file AF, and the device driver configuration program file DF in response to receiving the environmental settings information file KF.

If downloading fails while downloading a file, the control unit 30 temporarily cancels downloading files. Next, the control unit 30 requests the management device 10 to resend the environmental settings information file KF, and then downloads the files based on the environmental settings information file KF received in response to the request. The control unit 30 can request resending the environmental settings information file KF a specific number of times when downloading fails.

If downloading fails more than the specific number of times, the control unit 30 stops the network kitting process and controls the recording unit 31 to record a message that network kitting was stopped because downloading the required files failed. By reading this information, the user can know that network kitting was aborted and the reason why, and based thereon can execute an appropriate process.

If downloading all files is successful, the control unit 30 ends the communication process.

After the communication process ends, the control unit 30 executes a data analysis process (step SG8).

In the data analysis process of step SG8, the control unit 30 reads the content of the downloaded configuration information file JF, and determines if the content is valid. The control unit 30 determines, for example, that the content of the configuration information file JF is invalid if information related to the required settings is not contained in the configuration information file JF, or if there is a conflict between a configuration parameter and the value to be set for that parameter. If a problem with the content of the configuration information file JF is found, the control unit 30 aborts the network kitting process and controls the recording unit 31 to record that network kitting was aborted because the configuration information file JF that was downloaded contains invalid data. By reading the recorded information, the user knows that network kitting was aborted and the reason why, and based thereon can execute an appropriate process.

Also in the data analysis process of step SG8, the control unit 30 determines if the downloaded application configuration program file AF and device driver configuration program file DF contain corrupted data. The control unit 30 can use checksum error detection to detect corrupted data, for example. If data corruption is detected, the control unit 30 aborts network kitting and controls the recording unit 31 to record a message that network kitting was aborted because the downloaded program file is corrupted. By reading the recorded information, the user knows that network kitting was aborted and the reason why, and based thereon can execute an appropriate process.

If the content of the configuration information file JF is not invalid, and the program files are not corrupted, the control unit 30 ends the data analysis process.

After the data analysis process, the control unit 30 executes the configuration process (step SG9).

In the configuration process of step SG9, the control unit 30 rewrites the content of the configuration file stored in the storage unit 38 based on the content of the configuration information file JF. As a result, the operating settings recorded in the configuration file are set according to the scale (size) of the store (business) where the recording device 12 is installed. When rewriting the content of the configuration file, the control unit 30 does not configure settings related to communication when connected to the local area network LN. More specifically, the control unit 30 does not change the settings related to at least the IP address (IP address for the store), subnet mask, default gateway address, and DNS server address used on the local area network LN. This is because the recording device 12 is connected to the setup network SN, and changing these settings will disable normal communication with the management device 10 through the setup network SN.

If rewriting the configuration file fails, the control unit 30 reports the same to the management device 10. When such a report is received, the management device control unit 60 of the management device 10 executes an appropriate process. In addition, the control unit 30 aborts network kitting, and controls the recording unit 31 to record that network kitting was aborted because rewriting the configuration file failed. By reading the recorded information, the user knows that network kitting was aborted and the reason why, and based thereon can execute an appropriate process.

In the configuration process of step SG9, the control unit 30 also installs the program files contained in the application configuration program file AF, and the program files contained in the device driver configuration program file DF.

If installation fails, the control unit 30 reports the same to the management device 10. The management device control unit 60 of the management device 10 executes an appropriate process when this report is received. In addition, the control unit 30 aborts network kitting, and controls the recording unit 31 to record that network kitting was aborted because installing a program file failed. By reading the recorded information, the user knows that network kitting was aborted and the reason why, and based thereon can execute an appropriate process.

When rewriting the configuration file, and installing the program files contained in the application configuration program file AF and the program files contained in the device driver configuration program file DF is successfully completed, the control unit 30 ends the configuration process.

After completing the configuration process, the control unit 30 controls the network communication unit 37 to send a configuration completion report indicating that configuration based on the environmental settings information file KF received from the management device 10 was completed to the management device 10 (step SG10).

As shown in column (B) of FIG. 11, the management device control unit 60 of the management device 10 controls the management device network communication unit 61 to receive the configuration completion report (step SH9).

Next, the management device control unit 60 references the serial number database DB2 (step SH10).

Figure 13:
FIG. 13 shows an example of a serial number database.

FIG. 13 shows the data structure of the serial number database DB2.

As shown in FIG. 13, each record in the serial number database DB2 stores a serial number, IP address, attribute information, configuration information file JF, application configuration program file AF, device driver configuration program file DF, and a configuration time stamp (described further below).

Next, the management device control unit 60 creates one record as described below in the serial number database DB2 (step SH11).

In step SH11, the management device control unit 60 creates a record containing the serial number of the recording device 12 that sent the configuration completion report, the IP address for the store set in the recording device 12, the attribute information of the recording device 12, the configuration information file JF sent to the recording device 12, the application configuration program file AF sent to the recording device 12, the device driver configuration program file DF sent to the recording device 12, and a configuration time stamp indicating the time that the configuration completion report was received.

When configuration based on the environmental settings information file KF is completed by the recording device 12, the management device control unit 60 of the management device 10 thus relationally stores the serial number of the recording device 12, the IP address for the store, the attribute information, the environmental settings information file KF, and a configuration time stamp. The effect of this is described next.

Specifically, for each recording device 12, the management device 10 can manage an environmental settings information file KF used for configuration related to the serial number of the recording device 12. Therefore when queried for the environmental settings information file KF used to configure a recording device 12 using the serial number of the recording device 12 as the search key, the management device 10 can retrieve the corresponding environmental settings information file KF from the serial number database DB2. When resetting a recording device 12, the environmental settings information file KF linked to the serial number of the recording device 12 can be sent to the recording device 12 for configuration.

Operation of the recording device 12 when interrupting the setup network SN connection and connecting to the local area network LN deployed in the store system 11 of the store is described next.

Figure 14:
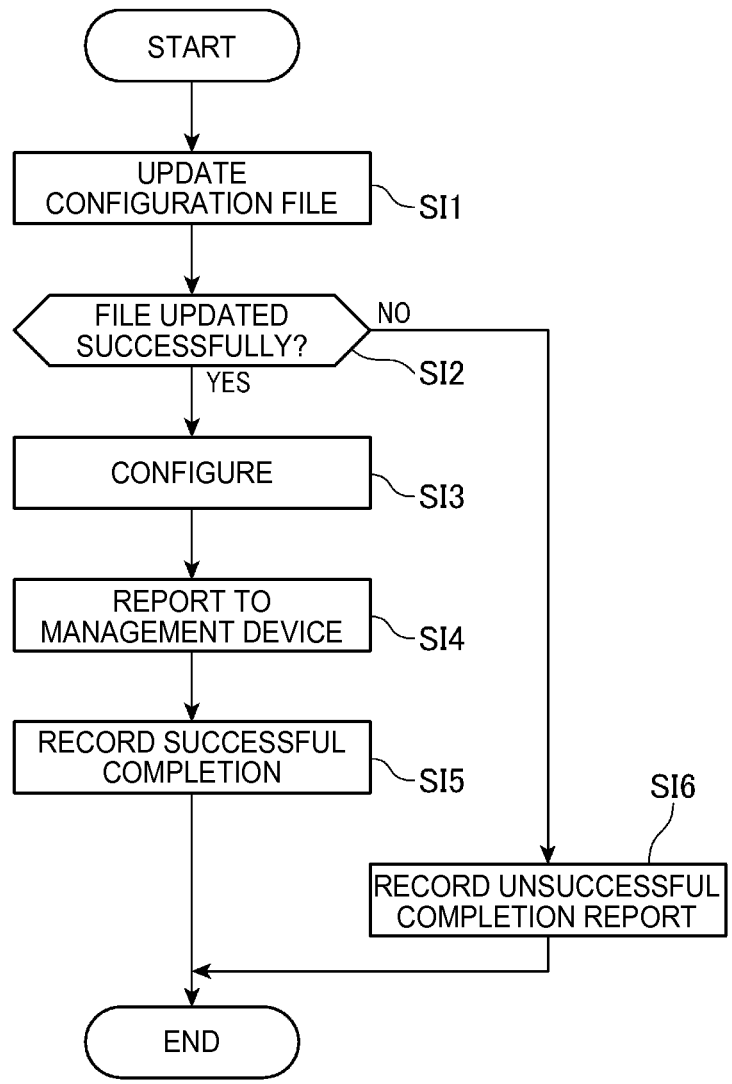
FIG. 14 is a flow chart of the operation of the recording device.

FIG. 14 is a flow chart of the operation of the recording device 12 when connecting to the local area network LN.

The recording device 12 executes the process shown in the flow chart in FIG. 14 when a start configuration command is received after the management device 10 completes the configuration related to communications on the management device 10 side and can connect to the local area network LN. This start configuration command is asserted by reading a specific barcode with the barcode reader BR, for example.

As shown in FIG. 14, the control unit 30 of the recording device 12 rewrites the corresponding information in the configuration file based on the settings related to communication when connected to the local area network LN that are contained in the configuration information file JF received from the management device 10 in the network kitting S3 process (step SI1).

Next, the control unit 30 determines if rewriting the configuration file ended successfully (step SI2).

If the configuration was successfully rewritten (step SI2 returns YES), the control unit 30 connects to the local area network LN based on the configured settings and can communicate with the management device 10 (step SI3). As a result, the recording device 12 can communicate with the management device 10, and can send control data to the management device 10 as described in step SB3 in column (B) of FIG. 3.

Next, the control unit 30 sends a successful completion report and the configured settings to the management device 10 (step SI4). The management device control unit 60 of the management device 10 then executes an appropriate process based on the report. For example, the management device control unit 60 may update the serial number database DB2 as necessary based on the reported settings. If the IP address was assigned dynamically by a DHCP server, the management device control unit 60 sets the value of the IP address in the corresponding record of the serial number database DB2 to the dynamically assigned IP address.

Next, the control unit 30 controls the recording unit 31 to record information that configuration was completed normally (step SI5). By reading the recorded information, the user knows that the recording device 12 connected to the local area network LN and can communicate with the management device 10.

If rewriting the configuration file is not successful (step SI2 returns NO), the control unit 30 controls the recording unit 31 to record the same (step SI6). By reading this information, the user knows that communication with the management device 10 is not possible because configuration was not successful, and can take appropriate action.

As described above, a recording device 12 according to this embodiment sends attribute information. The management device 10 receives the attribute information sent from the recording device 12, and sends a environmental settings information file KF (environmental settings information) stored relationally to the attribute information to the recording device 12. The recording device 12 receives the environmental settings information sent by the management device 10, configures the environmental settings based on the environmental settings information file KF, and when configuration is complete sends a configuration completion report indicating that configuration was completed to the management device 10. The management device 10 receives the configuration completion report sent by the recording device 12, and relationally stores the serial number (identification information) of the recording device 12 to the environmental settings information file KF sent to the recording device 12.

Thus comprised, a recording system 1 in which a recording device 12 and a management device 10 communicate over a network GN uses the ability of the devices to communicate over a network and a function of the management device 10 to configure the recording device 12. After configuration of the recording device 12 is completed, the management device 10 relationally stores the serial number of the recording device 12 in an environmental settings information file KF. As a result, for each recording device 12 in the system, the management device 10 can manage the environmental settings information file KF used to configure a particular recording device 12 relationally to the serial number of the recording device 12.

The recording device 12 in this embodiment of the disclosure also sends its serial number with the attribute information to the management device 10. The management device 10 relationally stores the serial number received with the attribute information from the recording device 12 to the environmental settings information file KF sent to the recording device 12.

Thus comprised, the recording device 12 can send its serial number with the attribute information when sending attribute information to the management device 10.

In this embodiment of the disclosure the environmental settings information file KF contains the IP address (first address) used by the recording device 12 to connect to the local area network LN (first network). When sending the environmental settings information file KF to the recording device 12, the management device 10 adjusts the value of the IP address contained in the environmental settings information file KF based on the attribute information of the recording device 12.

Thus comprised, the management device 10 can set the IP address of the recording device 12 to a value appropriate to the attribute information of the recording device 12.

In this embodiment of the disclosure, the recording device 12 connects to the management device 10 through a setup network SN (second network) using a different IP address (second address) than the IP address used on the local area network LN, and acquires the environmental settings information file KF from the management device 10. The recording device 12 then configures environmental settings other than the IP address (first address) used on the local area network LN, and sends a configuration completion report to the management device 10. The recording device 12 then connects to the local area network LN (first network) and changes the IP address setting.

Thus comprised, when the recording device 12 connection changes from the setup network SN to the local area network LN, the recording device 12 can connect to the local area network LN using the IP address set by the management device 10.

In this embodiment of the disclosure the recording device 12 also executes an appropriate error handling process if an error occurs while receiving the environmental settings information file KF or while configuring environmental settings based on the environmental settings information file KF.

Thus comprised, an appropriate error handling process is executed by the recording device 12 and problems resulting from the error can be suppressed when an error occurs while receiving the environmental settings information file KF or while configuring environmental settings based on the environmental settings information file KF.

The recording device 12 according to this embodiment has a recording unit 31 that records on roll paper (print media); a connection unit 40 that connects to a barcode reader BR (reading device); and a control unit 30 that records configuration parameter information with the recording unit 31, and when the result of reading with a barcode reader BR is input after recording the configuration parameter information, sets the configuration parameter to the value input based on the result of reading by the barcode reader BR.

Thus comprised, the user can set a configuration parameter to a specific value by reading the configuration parameter recorded on the roll paper and scanning the barcode matching the configuration parameter with the barcode reader BR. More specifically, the recording device 12 can be easily configured by reading barcodes with the barcode reader BR.

There are multiple configuration parameters in this embodiment, and the values of the configuration parameters are set in stages. After completing setting the value of one configuration parameter, the control unit 30 of the recording device 12 records information identifying the next configuration parameter to set with the recording unit 31.

Thus comprised, the user can easily set the values of the configuration parameters that are set in stages by simply to information printed by the recording device 12.

When the control unit 30 in this embodiment sets the value of a configuration parameter, it also records information identifying the set parameter value with the recording unit 31.

Thus comprised, the user can read the information recorded by the recording device 12 to know the parameter value that was actually set.

The control unit 30 in this embodiment also uses the recording unit 31 to record information about the configuration parameters related to communication when accessing the management device 10 through the network GN, and when the result of reading with the barcode reader BR is input after recording this information, sets the configuration parameter to the value based on the input result of reading.

Thus comprised, the user can easily configure communication for accessing the management device 10 through the network GN.

In this embodiment of the disclosure the management device 10 also stores a environmental settings information file KF. After enabling accessing the management device 10 through the network GN by configuring communication based on input from the barcode reader BR, the control unit 30 of the recording device 12 records information with the recording unit 31 indicating the configuration parameter for acquiring an environmental settings information file KF from the management device 10 through the network GN; sets the value of the configuration parameter based on the reading result that was input when the result of reading with the barcode reader BR is input based on the configuration parameter information that was recorded; acquires an environmental settings information file KF from the management device 10 based on a setting based on input from the barcode reader BR; and configures the environmental settings based on the acquired environmental settings information file KF.

Thus comprised, the user can easily complete the configuration needed to acquire the environmental settings information file KF from the management device 10 through the network GN.

OTHER EMBODIMENTS

Variations of the foregoing embodiment are described below.

In the embodiment described above, the control unit 30 of the recording device 12 sends both its serial number and attribute information to the management device 10.

Alternatively, the control unit 30 of the recording device 12 does not send the serial number with the attribute information. Instead, the control unit 30 of the recording device 12 sends the serial number with the configuration completion report when sending the configuration completion report to the management device 10.

Thus comprised, the recording device 12 uses transmission of the configuration completion report to send the serial number to the management device 10 with the configuration completion report.

The disclosure is described above with reference to a preferred embodiment thereof, but the disclosure is not limited thereto and can be modified and adapted in many ways without departing from the scope of the accompanying claims.

For example, specific examples of information the recording device 12 records while configuring the environmental settings are described with reference to FIG. 6. However, the content of the information the recording device 12 records is not limited to the information shown in FIG. 6. Specific examples of the wireless settings S1, network configuration S2, and network kitting S3 process are described above, but the settings (configuration) are not limited thereto.

Furthermore, the attribute information is information identifying a particular store in the example described above, but the attribute information may be any information identifying an attribute of the recording device 12.

A barcode reader BR is also used as an example of a reading device, but the reading device is not limited to a barcode reader BR and may be a device capable of reading 2D code symbols, for example.

The function blocks described above can also be desirably embodied by combinations of hardware and software, and do not suggest a specific hardware configuration.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. An information processing method comprising:
   transmitting, by a recording device, attribute information over a second network using a second address to acquire environmental settings information for configuring the recording device to operate on a first network;
   receiving, by a management device, the attribute information transmitted by the recording device over the second network;
   transmitting, by the management device, the environmental settings information stored relationally to the attribute information to the recording device over the second network, wherein the environmental settings information includes a first address for use by the recording device to connect to the first network;
   receiving, by the recording device, the environmental settings information transmitted by the management device over the second network;
   configuring, by the recording device, environmental settings on the recording device other than the first address for connecting to the first network based on the environmental settings information received over the second network;
   transmitting, by the recording device, a configuration completion report over the second network indicating configuration was completed to the management device when configuration is completed;
   switching from the second address to the first address and connecting to the first network using the first address, by the recording device, after transmitting the configuration report;
   receiving, by the management device, the configuration completion report transmitted by the recording device over the second network; and
   relationally storing, by the management device, the environmental settings information transmitted to the recording device with identification information of the recording device.

2. The information processing method of claim 1, further comprising:
   transmitting, by the recording device, the identification information with the attribute information to the management device; and
   storing, by the management device, the identification information received with the attribute information from the recording device relationally to the environmental settings information transmitted to the recording device.

3. The information processing method of claim 1, further comprising:
   transmitting, by the recording device, the identification information with the configuration completion report to the management device; and
   storing, by the management device, the identification information received with the configuration completion report from the recording device relationally to the environmental settings information transmitted to the recording device.

4. The information processing method of claim 1,
   adjusting, by the management device, the value of the first address contained in the environmental settings information based on the attribute information of the recording when transmitting the environmental settings information to the recording device.

5. The information processing method of claim 1, wherein:
   when an error occurs while receiving the environmental settings information or while configuring the environmental settings based on the environmental settings information, the recording device executes a process appropriate to the error that occurred.

6. A recording system comprising:
   a recording device configured to:
   transmit attribute information over a second network using a second address to acquire environmental settings information for configuring the recording device to operate on a first network,
   receive the environmental settings information sent over the second network, wherein the environmental settings information includes a first address for use by the recording device to connect to the first network,
   configure environmental settings on the recording device other than the first address for connecting to the first network based on the environmental settings information received over the second network,
   transmit a configuration completion report over the second network indicating configuration was completed when configuration is completed, and
   switch from the second address to the first address and connect to the first network using the first address after transmitting the configuration report; and
   a management device configured to:
   store the environmental settings information relationally to the attribute information,
   transmit the environmental settings information stored relationally to the received attribute information to the recording device over the second network when the attribute information is received from the recording device, and
   when the configuration completion report based on the transmitted environmental settings information is received, relationally stores the environmental settings information transmitted to the recording device with identification information of the recording device.

7. The recording system of claim 6, wherein:
the recording device transmits the identification information with the attribute information to the management device; and
the management device stores the identification information received with the attribute information from the recording device relationally to the environmental settings information transmitted to the recording device.

8. The recording system of claim 6, wherein:
the recording device transmits the identification information with the configuration completion report to the management device; and
the management device stores the identification information received with the configuration completion report from the recording device relationally to the environmental settings information transmitted to the recording device.

9. The recording system of claim 6, wherein:
the management device adjusts the value of the first address contained in the environmental settings information based on the attribute information of the recording when transmitting the environmental settings information to the recording device.

10. The recording system of claim 6, wherein:
when an error occurs while receiving the environmental settings information or while configuring the environmental settings based on the environmental settings information, the recording device executes a process appropriate to the error that occurred.

* * * * *